United States Patent [19]

Bushnell et al.

[11] Patent Number: 4,620,066
[45] Date of Patent: Oct. 28, 1986

[54] METHOD AND APPARATUS FOR SHARING OPERATORS AMONG ASSISTANCE SYSTEMS

[75] Inventors: William J. Bushnell, St. Charles; Richard W. Hemmeter, Naperville; Palanichamy Raghavan, Woodridge, all of Ill.

[73] Assignee: AT&T Bell Laboratories, Murray Hill, N.J.

[21] Appl. No.: 655,693

[22] Filed: Sep. 27, 1984

[51] Int. Cl.[4] .................................................... H04M 3/60
[52] U.S. Cl. .................................. 179/27 D; 179/27 FF; 179/8 A
[58] Field of Search .............. 179/8 A, 27 D, 27 DA, 179/27 DB, 27 FF, 27 FG, 27 FH

[56] References Cited

U.S. PATENT DOCUMENTS

| | | | |
|---|---|---|---|
| 2,115,133 | 4/1938 | Allison | 179/42 |
| 2,520,130 | 8/1950 | Deakin | 179/27 |
| 2,621,258 | 12/1952 | Balzer | 179/27 |
| 2,697,134 | 12/1954 | Balzer | 179/27 |
| 2,839,612 | 6/1958 | Quatman | 179/27 |
| 2,922,847 | 1/1960 | Dunning | 179/27 |

OTHER PUBLICATIONS

H. Yabe: "Traffic Assistance Service System for ESS", *IEEE Trans. Comm.*, V. COM-28, No. 1, pp. 117-121, Jan. 1980.
C. Iwata et al., "Traffic Assistance Service System: North American Version", *NEC Research & Development*, No. 64, Jan. 1982, pp. 51-61.
R. Delit, "ITT1240 Digital Exchange Operator Subsystem", *Electrical Communication*, vol. 56, No. 2/3, 1981, pp. 248-263.
R. V. Moberly and M. A. Pashley, "The System X Operator Services," *International Switching Symposium* 1981, (Montreal), Session 21A, Paper 5, pp. 1-6, Sep. 1981.
J. C. Ehlinger and R. W. Stubblefield, "No. 1 PSS: Number 1 Packet Switching System Serivce Capabilities and Architecture", *IEEE International Conference on Communications*, vol. 3, pp. 1371-1374, Jun. 19-22, 1983.
"TOPS Operator Centralization DMS-200", *Northern Telecom*, (Manufacturers Brochure), Nov. 1983, pp. 1-13.
"Operator Services Planning Letter", *Northern Telecom*, (Manufacture Brochure), Jan. 26, 1984, pp. 60-68.

*Primary Examiner*—Stafford D. Schreyer
*Attorney, Agent, or Firm*—Werner Ulrich; Peter Visserman

[57] ABSTRACT

An arrangement for serving an operator assistance request detected in a first operator assistance system from an operator position in a second operator assistance system. If a first operator assistance system is overloaded or has no attended operator positions, the two operator assistance systems cooperate to establish a connection between the customer requesting operator assistance and the operator position in the second system. The attending operator at that position keys information into the operator position for transmission to the first system. Responsive to this data, the first system enters data, such as billing data, into its records, and sets up connections, such as a connection for a person-to-person call, in its switching network. The arrangement can be used to transfer operator assistance requests at night, during overload, or to specialized operators not available at the first office. The arrangement can also be used on a permanent basis, to transfer all operator assistance requests, when a serving team of operators cannot be economically justified for the first office.

27 Claims, 15 Drawing Figures

INTERCONNECTED OPERATOR ASSISTANCE SYSTEMS

FIG. 6

CALL CONTROL MESSAGES

500 — CALL REQUEST

| MESSAGE TYPE | LOCAL PROCESS NO. | LOCAL SYSTEM NO. | REMOTE SYSTEM NO. | TYPE OF REQUEST | CALL DATA |
|---|---|---|---|---|---|
| 501 | 502 | 504 | 505 | 506 | 508 |

510 — REMOTE SETUP COMPLETE — 520

| MESSAGE TYPE | LOCAL PROCESS NO. | LOCAL SYSTEM NO. | REMOTE PROCESS NO. | REMOTE SYSTEM NO. | CONNECTING TRUNK |
|---|---|---|---|---|---|
| 511 | 512 | 514 | 516 | 518 | |

| POSITION NO. |
|---|
| 522 |

530 — REMOTE SETUP COMPLETE (CONFIRMATION)

| MESSAGE TYPE | LOCAL PROCESS NO. | LOCAL SYSTEM NO. | REMOTE PROCESS NO. | REMOTE SYSTEM NO. |
|---|---|---|---|---|
| 531 | 532 | 534 | 536 | 538 |

540 — INTERMEDIATE MESSAGE

| MESSAGE TYPE | LOCAL PROCESS NO. | LOCAL SYSTEM NO. | REMOTE PROCESS NO. | REMOTE SYSTEM NO. | DATA |
|---|---|---|---|---|---|
| 543 | 542 | 544 | 546 | 548 | 541 |

550 — DISCONNECT OPERATOR POSITION

| MESSAGE TYPE | LOCAL PROCESS NO. | LOCAL SYSTEM NO. | REMOTE PROCESS NO. | REMOTE SYSTEM NO. | DATA |
|---|---|---|---|---|---|
| 555 | 551 | 552 | 553 | 554 | 556 |

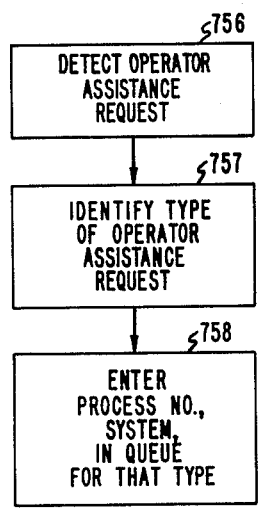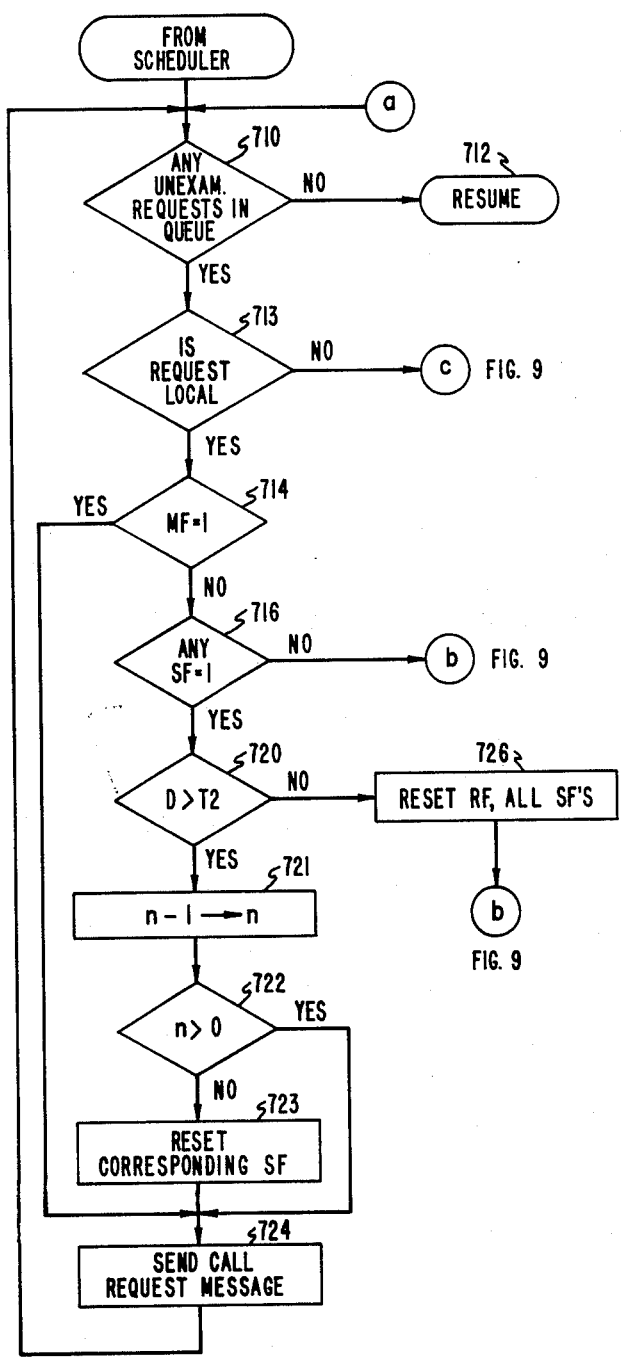

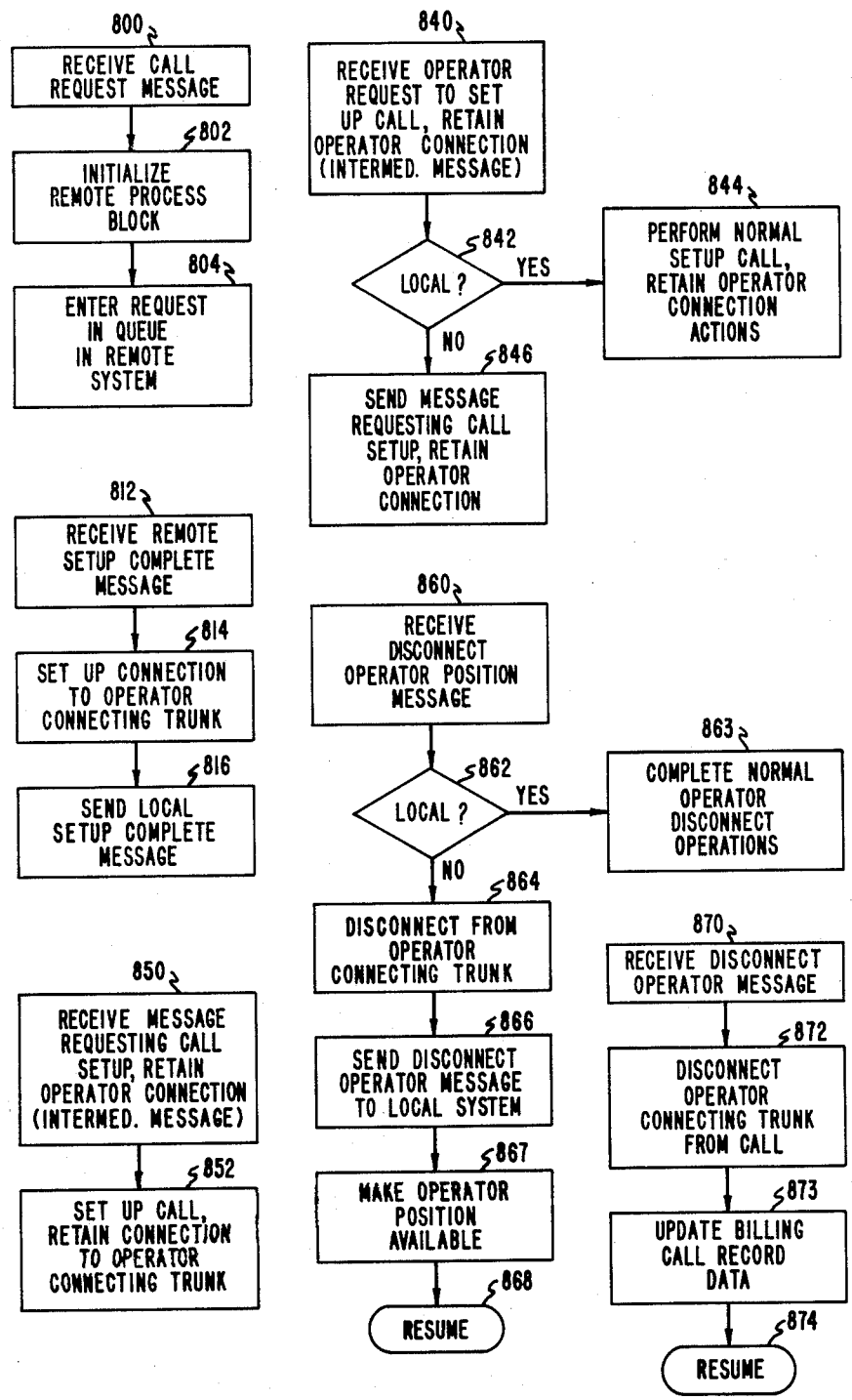

FIG. 12

OPERATOR ASSISTANCE
REQUEST TRANSFER CONTROL MESSAGES

ALL REQUESTS
560 — TRANSFER/CANCEL TRANSFER

| MESSAGE TYPE | TYPE OF REQUEST | LOCAL SYSTEM NO. | REMOTE SYSTEM NO. |
|---|---|---|---|
| 561 | 562 | 564 | 566 |

570 — TRANSFER REQUEST

| MESSAGE TYPE | TYPE OF REQUEST | LOCAL SYSTEM NO. | REMOTE SYSTEM NO. |
|---|---|---|---|
| 571 | 572 | 573 | 574 |

580 — TRANSFER PERMIT

| MESSAGE TYPE | TYPE OF REQUEST | NO. OF CALLS | LOCAL SYSTEM NO. | REMOTE SYSTEM NO. |
|---|---|---|---|---|
| 581 | 582 | 584 | 586 | 588 |

590 — STATUS MESSAGE

| MESSAGE TYPE | TYPE OF REQUEST | NO. OF ACTIVE POSITIONS | NO. OF AVAIL. POSITIONS | LENGTH OF QUEUE | TRUNKS AVAILABLE |
|---|---|---|---|---|---|
| 591 | 592 | 594 | 596 | 598 | 599 |

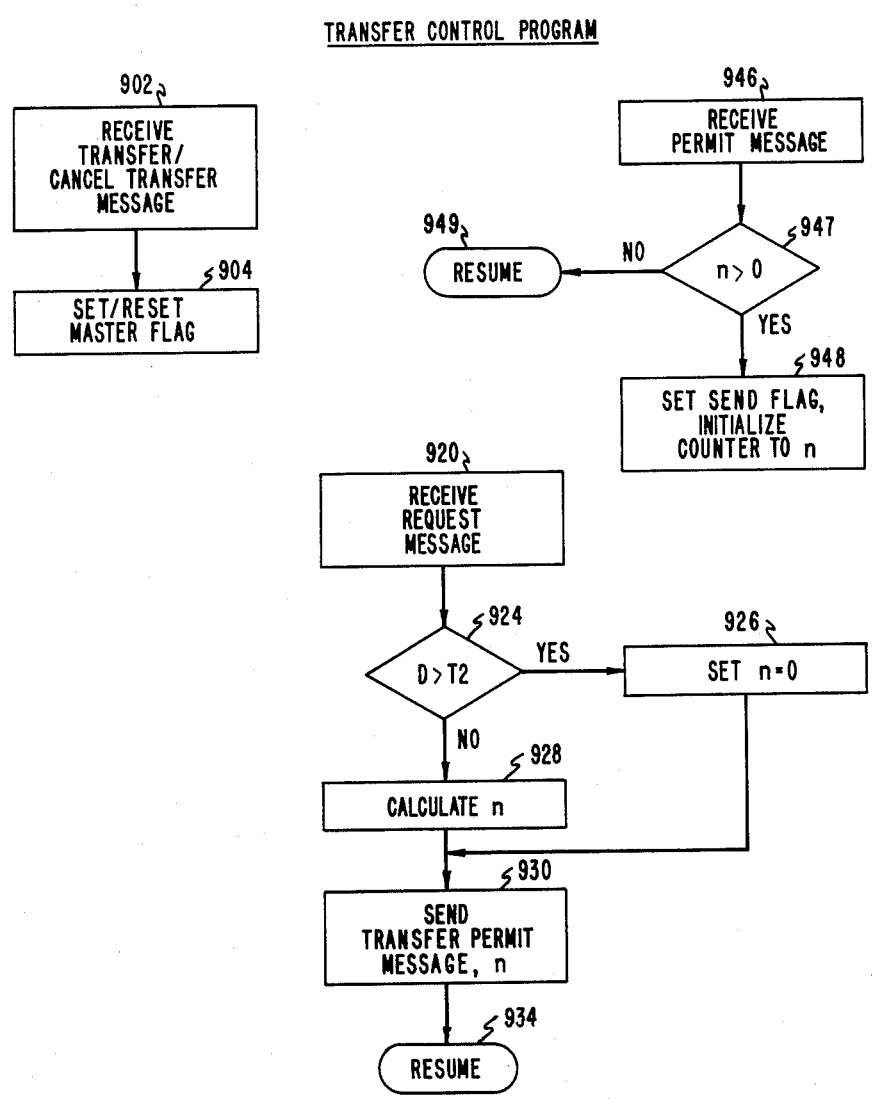

METHOD AND APPARATUS FOR SHARING OPERATORS AMONG ASSISTANCE SYSTEMS

TECHNICAL FIELD

This invention relates to operator assistance systems for use in communication networks and, more specifically, to arrangements for sharing operators among several such operator assistance systems.

BACKGROUND OF THE INVENTION

Because the expense of providing operator services in communication systems is high, continuing efforts are being made to provide such services more efficiently. Modern systems use a program controlled processor for automatically performing many of the functions required for customer-dialed operator assistance calls. Such operator assistance systems connect the operator with the customer only when operator assistance is needed, i.e., when an operator assistance request is recognized in the system. At such times, an attended (active) operator position is connected to a customer, or bridged to a call connection which may already be set up, and is disconnected when service of the operator assistance request has been completed. The operator assistance system accumulates information concerning a call and displays that information at an operator position. Using this information about the current state of a call, an attending operator communicates verbally with the customer and keys additional call control and call record data into a terminal at the operator position. This data is sent to the control processor of the operator assistance system which then controls additional call configuration change functions, such as call connection and disconnection, and records billing and other data about the call.

Modern operator assistance systems usually serve calls from other end offices (telephone central offices connected to customers). Some also serve calls from customers connected directly to the system by customer lines. It is well known in the art that the cost of the transmission facilities, usually called trunks, for interconnecting end offices and operator assistance systems tends to be lower when the size of the geographic area supported by one operator assistance system is relatively small since transmission facility mileage requirements will be lower; this factor tends to favor the use of a large number of smaller operator assistance systems. However, it is also well known in the art that large groups of operators serve operator assistance requests more efficiently than small groups; this factor tends to favor the use of a small number of large operator assistance systems. In practice, a trade-off is usually made in the direction of a small number of large operator assistance systems. Therefore, a problem of the prior art is that more expensive voice transmission facilities are required.

Operator assistance traffic is much lower at night, especially after midnight. Even large operator assistance systems usually have small, hence less efficient, teams of operators on duty during such night hours. A problem of the prior art systems is that the night operator assistance traffic from multiple geographic regions cannot be funneled into a centralized operator assistance system, but must continue to be served from the same operator assistance system which handles the daytime traffic from that region. While some older operator systems, such as automatic call distributors used for incoming calls to large businesses, offer the night transfer feature, this feature is usually implemented by simply reswitching calls to another location; such an arrangement cannot support systems in which the operator controls the configuration and billing of a call.

It has been recognized by those in the telecommunication art that it would be economically advantageous to serve operator assistance calls in a system which is too small to justify the presence of a team of operators even during normal business hours; to handle such a situation efficiently, operator assistance requests on calls in such a system must be served by operators from another system. Small operator assistance systems and larger systems carrying only a small amount of operator assistance traffic are likely to be more prevalent as modern systems which are economical at small sizes are provided with operator assistance features. A problem in the prior art is that no arrangements are available to permit an operator in one operator assistance system to serve an operator assistance request from the call of another operator assistance system.

These problems of the prior art are all manifestations of a common limitation of prior art systems: operator assistance traffic from a given geographic area is served by operators associated with a given operator assistance system. This limitation is brought about by restrictions on the kinds of signals which may be passed through the public switched network and the characteristics of the data necessary to support an operator assistance request, much of which is only available in the operator assistance system connected to the calling customer. Part of this data pertains to the particular call and is accumulated during the course of the call. Another part, for example, for calculating coin call charges, is specific to the particular geographic area served by an operator assistance systems. Signaling messages and other data for identifying the directory number and geographic location of a customer originating an operator assistance call are available only in the single operator assistance system serving the geographic area of that customer. Since some calls generate more than one operator assistance request, each request usually served by a different operator, the data for notifying an operator of what has transpired on a given call must be available to any operator serving that call. All of these factors indicate that a complete data base can be readily provided only at the operator assistance system which initially receives a call.

In summary, a need exists for a system to allow operators associated with one operator assistance system to selectively serve operator assistance requests for calls directed to another operator assistance system, and the need has not been met in the prior art because of the limitations imposed by the need for data derived from a data base and incoming and outgoing signaling tied to the latter system.

SUMMARY OF THE INVENTION

In accordance with the present invention, two operator assistance systems cooperate by connecting an operator assistance call entering the first operator assistance system to an operator position at the second operator assistance system. The operator at the operator position at the second system responds to customer requests by keying control information. This information is sent to the first operator assistance system and is used for altering the configuration of the call or the call records in the first system accordingly. Advantageously, such an arrangement permits an operator at a second operator assistance system to serve an operator assistance request from a customer connected to a first operator assistance system. Further, the connection to the called customer may be routed to an appropriate end office over the public switched network connecting or completing trunks of the first system, thus utilizing less expensive voice transmission facilities.

In accordance with one embodiment of the invention, each of the two operator assistance systems includes a stored program controlled processor system for controlling call configurations, communicating with operator positions, and recording call data. The processor of the first system sends the processor of the second system a message including data about a call and requesting connection to an operator position. The two systems then cooperate to set up a connection from the incoming line or trunk at the first system to the operator position in the second system. The processor of the second system communicates with the operator position of the second system, sending signals to control a display, receiving call control and billing data and control signals keyed in by an operator at the operator position. When the operator keys a call setup or disconnect request, the processor of the second system sends additional data and requests back to the processor of the first system. The connection to the operator position is cooperatively torn down under the control of the two processors. Advantageously, this arrangement permits the data resources of the first system to be used even though the operator assistance request is served from an operator position in the second system.

In accordance with one embodiment of the invention, the processor of the first system makes a decision whether to use an operator position at the first system or at the second system for a given call. This decision is based on a master transfer flag indicating that all calls are to be transferred, and one or more send flags for indicating that some calls may be transferred. A send flag is set when a heavy operator assistance request load is recognized in the first system and appropriate load status information, such as a call transfer permit message, is received from the second system. Operator assistance calls are categorized into different types, and master and send flags maintained for each type. Advantageously, such an arrangement permits night transfer of all requests to the second system; dynamic interflow or sharing of load by operator teams at the two systems; in case one type of operator team is not provided in the first system, static interflow of operator assistance requests served by that type of operator team; and, if no operators are provided in the first system, operator centralization. Further, such an arrangement permits each operator assistance system to be fully loaded during busy hours, and allows all but one system of a group to be unstaffed at night. In addition, such an arrangement permits different night transfer, dynamic sharing and centralization policies to be implemented for different types of calls.

In accordance with an alternative embodiment of the invention, the processor of the first system communicates directly via data communication arrangements with an operator position of the second system. Advantageously, such an arrangement simplifies the control software since the communications between processor and operator position are the same for a local or remote operator position.

In accordance with one embodiment of the invention, a group of systems can be interconnected to transfer operator assistance request traffic among operator teams at the different systems. In accordance with one specific arrangement, one of these systems can allocate traffic among the operator teams in all the systems. Advantageously, such an arrangement can be used to optimize the utilization of operators in all of the systems of the group.

BRIEF DESCRIPTION OF THE DRAWING

The invention will be better understood from the following detailed description when read with reference to the drawing in which:

FIGS. 6 and 12 show a series of formats for call control and operator assistance request transfer control messages between processors of the two systems;

FIGS. 7–11 and 13 are a series of program flow diagrams illustrating the data processing and control of operator assistance calls and transfer of operator assistance requests;

DETAILED DESCRIPTION

Figure 1:
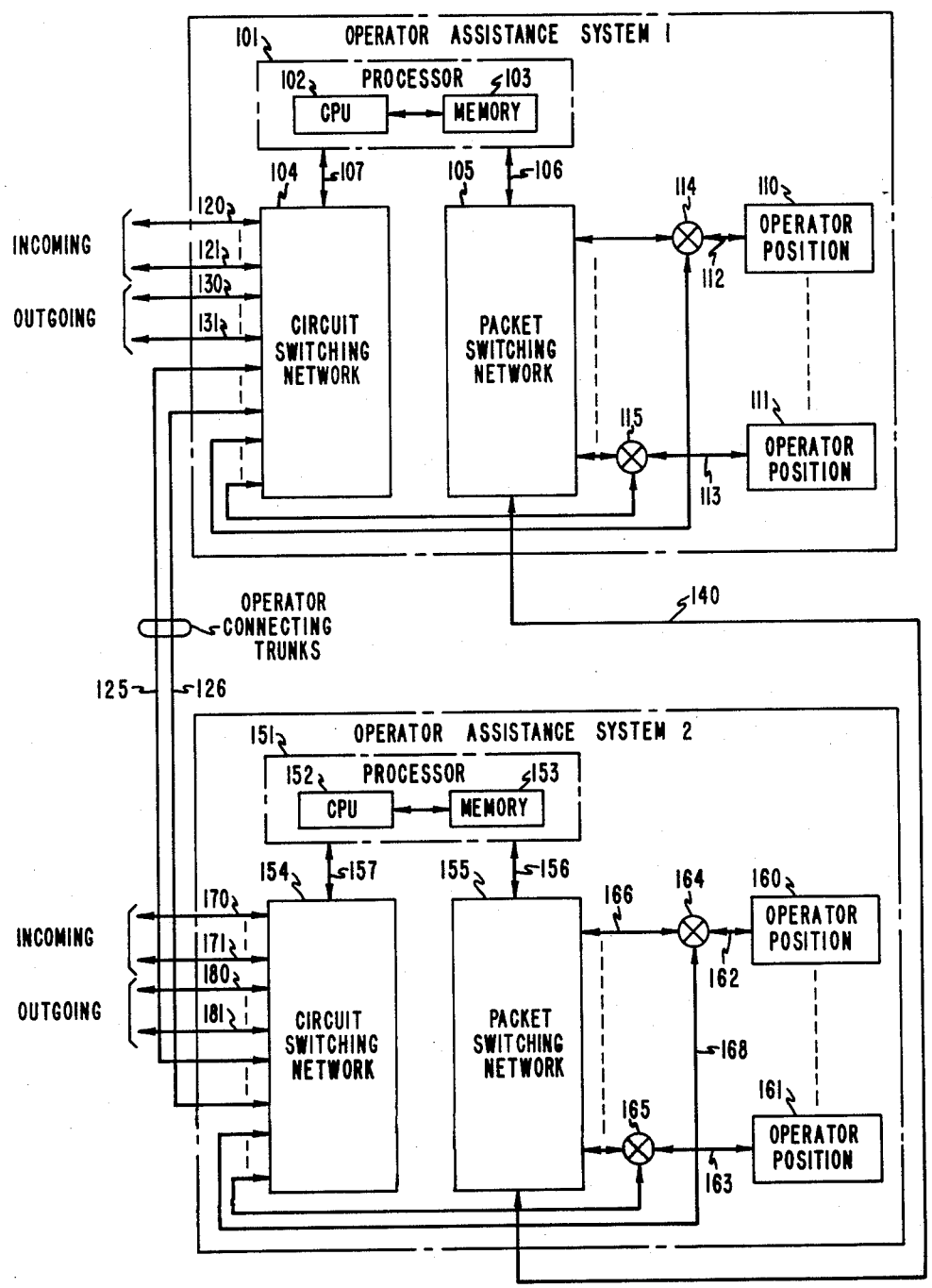
FIG. 1 is a system block diagram of an illustrative embodiment of the invention showing two operator assistance systems, including operator positions.

FIG. 1 illustrates one embodiment of the present invention. Shown are two operator assistance systems 1 and 2. System 1 is connected to a group of incoming lines to customers or incoming trunks from other offices 120, . . . ,121, or both, which terminate on a digital circuit switching network 104, which may be any well known telephone switching network. For convenience, lines, which are commonly two-way, and those trunks which are two-way, are designated as incoming or outgoing according to the function performed in a particular call. A similar group of incoming lines or trunks 170, . . . ,171 is shown connected to operator assistance system 2, terminating on a corresponding digital circuit switching network 154. Circuit switching network 104 of operator assistance system 1 is also connected to a group of operator positions 110, . . . ,111 via paths 112, . . . ,113 and multiplexers 114, . . . ,115. Similarly, circuit switching network 154 of operator assistance system 2 is connected to a group of operator positions 160, . . . ,161 via paths 162, . . . ,163 and multiplexers 164, 165. Also shown are outgoing lines or trunks 130, . . . ,131 terminating on circuit switching network 104 of operator assistance system 1 and outgoing lines or trunks 180, . . . ,181 terminating on circuit switching network 154 of operator assistance system 2; the trunks are connected to distant switching systems.

In the case of an operator assistance request served according to the principles of prior art systems by a local operator position, a call is set up from one of the incoming lines or trunks 120, . . . ,121 to one of the outgoing lines or trunks 130, . . . ,131 before or after an operator assistance request has been served. Processor 101 routinely monitors these lines and trunks and controls network 104 to make the necessary connections in a well known manner. In addition, when an operator assistance request is detected by processor 101, one of the operator positions 110, . . . ,111 is bridged onto the call connection or a connection is made between the operator position and an incoming line or trunk 120, . . . ,121, so that the operator may establish verbal communication with the customer placing the call. The operator requests information from the customer and keys call control information into the system from the operator position. Thereafter, the operator position is disconnected from the call. Operator assistance system 2 works in the same way setting up calls between incoming lines or trunks 170, . . . ,171 and outgoing lines or trunks 180, . . . ,181, and setting up connections to one of the operator positions 160, . . . ,161. Calls in which an operator position at the local system serves the operator assistance request are referred to as conventional calls in this description; similarly, call processing actions and call data used for conventional calls and conventional operator assistance connections are referred to as conventional.

An operator assistance system in accordance with the present invention is particularly adapted to deal with operator assistance requests in which the call comes from an originating customer into one operator assistance system, hereafter called the local system, and the operator assistance request is served by an operator position in a second operator assistance system, hereafter called the remote system. In order to handle this type of operator assistance request, operator connecting trunks 125, . . . ,126 are provided to interconnect the two systems of FIG. 1. Effectively, these form part of a means of communication between the systems to allow operators in one system to serve operator assistance request from another. Operator connecting trunks are used to connect an operator position of one system to an incoming line or trunk or to an existing call connection of another system. A data communication path 140, such as a trunk for transmitting data at a 16 kilobit/second rate, interconnects system 1 and 2 and is used for transmitting data messages between the two systems. The data communication path forms another part of the communication means between the systems. These data messages, described further below with respect to FIGS. 6 and 12, are used to permit the two systems to cooperate in setting up a connection from the local system to an operator position in the remote system, and to transmit call data between the two systems.

In order to control operator assistance calls, each of the operator assistance systems is controlled by a stored program controlled processor. Processor 101 in operator assistance system 1 includes a central processing unit 102 and memory 103. Processor 101 can communicate data through a data channel 106 via a packet switching network 105 with any of the operator positions 110, . . . ,111. The packet switching network 105 may be any well known packet switching network. Processor 101 controls circuit switching network 104 through control path 107. Similarly, operator assistance system 2 includes a stored program controlled processor 151 which includes a central processing unit 152 and memory 153. Processor 151 can similarly communicate data through a data channel 156 via the packet switching network 155 with the operator positions 160, . . . ,161. Processor 151 controls circuit switching network 154 through control path 157. The processors 101 and 151 of the two systems each contain all of the programs outlined in the flow diagrams of FIGS. 7–11 and 13 and execute the appropriate ones in order to control the process of setting up a connection from the local system to the operator position at the remote system, i.e , the remote operator position.

In the present embodiment of the invention, if an operator position of system 2 is to handle a call in system 1, system 1 sends a message via data communication path 140 to system 2 asking that a connection be set up between one of the operator connecting trunks 125, . . . ,126 and one of the operators positions 160, . . . ,161. System 2 sets up such a connection and responds with a message to system 1 that a connection has been set up between an operator position and a specified operator connecting trunk. System 1 then connects the specified operator connecting trunk to the line or trunk connected to the originating customer, or adds that connecting trunk to an existing connection.

Alternatively, system 1 could set up a connection from the line or trunk connected to the originating customer, or from an existing connection, to an operator connecting trunk, and system 2 could then set up a connection from that operator connecting trunk to an operator position. The alternative approach increases the holding time of the operator connecting trunk if further delay is encountered in finding an available operator position in system 2.

The operator assistance positions for these operator assistance systems are arranged to work in an integrated services digital network (ISDN) environment. The concepts of ISDN have been extensively studied by the International Telegraph and Telephone Consultative Committee (CCITT) and are described, for example, in International Telecommunications Standards: Issues and Implications for the 80's—A summary Record of a July 1982 Workshop, edited by D. M. Cerni and E. M. Gray and published in May, 1983, by the U.S. Department of Commerce (Document NTIA-SP-83-15).

The operator position terminals at operator positions 110, . . . ,111 and 160, . . . ,161 are compatible with ISDN and are referred to as ISDN terminals. ISDN terminals are arranged to receive and transmit a single digital bit stream, operating at 16, 80 or 144 kilobits per second (kb). The bit stream includes a "D-Channel" operating at 16 kb for the transmission of control and data packets, and zero, one or two "B-channels" operating at 64 kb each for the transmission of digitized voice or higher speed data packets. In the ISDN the B- and D-channels are separately switched and assembled into a single bit stream as they are transmitted to a terminal. In this exemplary embodiment, the D-channels are switched via packet switching network 105 or 155 while the B-channels are switched via digital circuit switching network 104 or 154; the operator position terminal communicates with the rest of the operator assistance system via an 80 kb digital bit stream, comprising a B-channel and a D-channel. The 16 kb D-channels from packet switching network 105 and the 64 kb B-channels from digital circuit switching network 104 are combined in digital multiplexers 114, . . . ,115, which may be any well known digital multiplexer, and then routed via combined data and voice paths 112, . . . ,113 to operator positions 110, . . . ,111. Similar facilities are provided within operator assistance system 2.

In the present embodiment of the invention, separate packet and circuit switching networks are used as shown in FIG. 1. Alternatively, a combined circuit and packet switching network for use in an ISDN, as described in the copending application by Beckner et al.: "Integrated Packet Switching and Circuit Switching System", Ser. No. 606,937, filed May 3, 1984, and assigned to the assignee of the present application, could be used to implement the invention.

Figure 2:
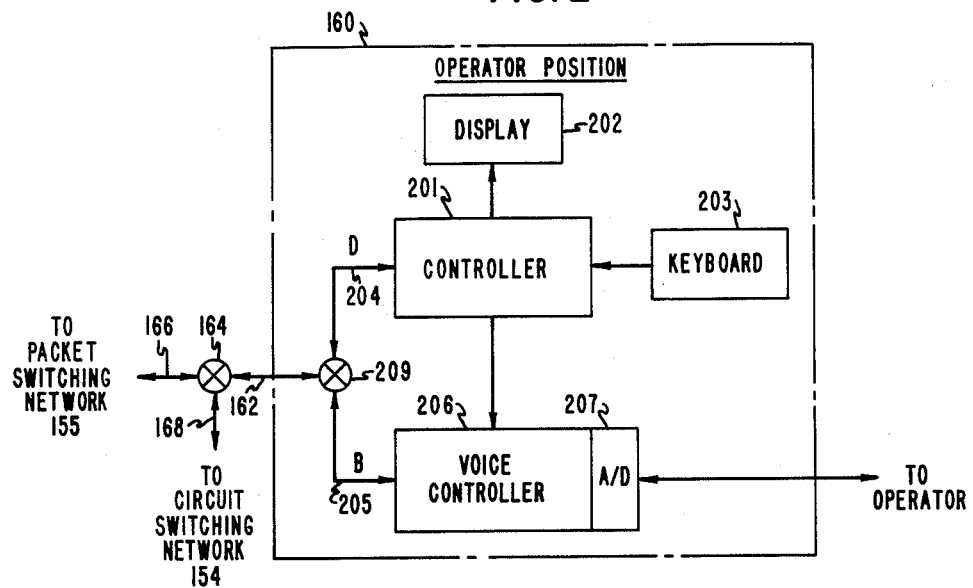
FIG. 2 is a detailed block diagram of an operator position of FIG. 1.

Details of the operator position are illustrated in FIG. 2, which shows a typical operator position, operator position 160 of operator assistance system 2. Coming into operator position 160 is an 80 kb digital bit stream on data path 162 from multiplexer 164. Multiplexer 164 is connected to circuit switching network 154 via path 168 and packet switching network 155 via path 166. The 80 kb digital stream comprises one 64 kb B-channel and one 16 kb D-channel. The B-channel is used for voice communicaLions and the D-channel is used for packetized data communications with processor 151. The 80 kb stream enters the operator position 160 via data path 162 and terminates at demultiplexer 209 which separates out the D- and B-channel bit streams. The B-channel bit stream is routed from demultiplexer 209 via path 205 to a voice controller 206, which handles such functions as echo suppression. The voice controller is connected to a bidirectional analog/digital converter 207, which is connected to an operator's headset (not shown). The D-channel bit stream is routed from demultiplexer 209 via path 204 to controller 201, which controls voice controller 206 and display 202 and receives input from a keyboard 203. Thus, an operator at operator position 160 has a voice connection through circuit switching network 154 to a customer via a B-channel, and a packet switched data connection through packet switching network 155 to processor 151 via a D-channel. Since the voice and data communications between the operator position 160 and networks 154 and 155 are bidirectional, the units 164 and 209 are are also bidirectional and are multiplexer/demultiplexer units, and the A/D converter 207 is a combined analog/digital and digital-/analog converter. The same is true for corresponding units associated with other operator positions of FIG. 1.

When the operator at operator position 160 is initially connected to a customer, an initial display control message from processor 151, sent via packet switch network 155 to the operator position, sets up the operator position display. This informs the operator of the major details of the call so that the operator may interact verbally with the customer and receive additional information. The operator, using keyboard 203, then keys further data into the operator position. The controller 201 then sends this keyed data to processor 151. Processor 151 may send a message to processor 101 to alter the configuration of the call (for example, by letting the call complete to its destination) or may record information about the call (such as the calling card number of the calling customer) on the basis of the data keyed into the operator position by the operator.

Figure 3:
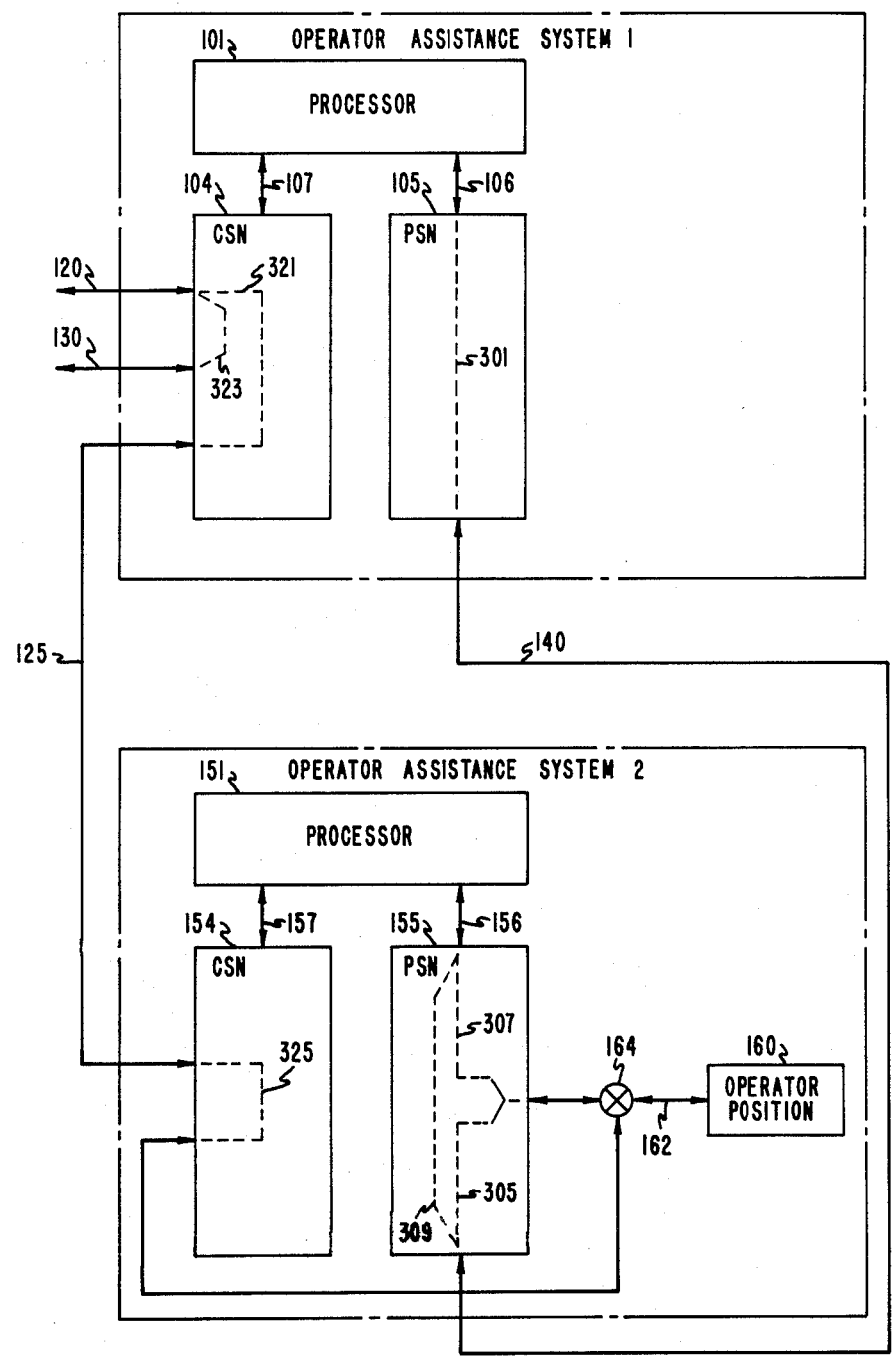
FIG. 3 is a call configuration diagram showing the various communication and data paths used in an illustrative operator assistance call.

In order to further illustrate the invention, a call will be followed from its origination to its disconnection. In the initial description of the handling of this call, it is assumed that operator assistance system 1 is in the night transfer mode. In the night transfer mode, all operator assistance requests are served from operator positions at another system, in this case system 2. The call, whose configuration is illustrated in FIG. 3, is from an originating customer on incoming line 120 of system 1 going to a terminating customer via outgoing trunk 130 of system 1. In order to further illustrate the principles of the invention, a person-to-person call is used as an example. When this call is placed, the calling customer dials "0" followed by the directory number of the called customer. For this type of call, an operator assistance request is detected when the end of dialing has been recognized. Operator position 160 of system 2 is connected to the incoming line 120 via operator connecting trunk 125 after the customer has finished dialing. The operator at operator position 160 finds out from the customer the call type (person-to-person) and the name of the requested called party. The operator then keys conventional data into the keyboard 203 of operator position 160, which data when transmitted to system 1 indicates that a connection should be set up between the calling and called customers while the operator stands by. After the operator has aurally verified that the requested called party is on the line, the operator keys further conventional data into keyboard 203, which data when transmitted to system 1 signals to system 1 to start charging for the call, to bill the call as a person-to-person call, and to disconnect the operator connecting trunk. The operator signals to system 2 to disconnect the operator position.

FIG. 3 shows various voice and data paths associated with this call. When the customer has finished dialing and the operator assistance system has detected the operator assistance request implied by that completion of dialing, an operator position at a remote system (system 2) is connected to incoming line 120. This connection is illustrated as being via path 321 in circuit switch network 104 of operator assistance system 1 (the local system), operator interconnecting trunk 125, and path 325 in circuit switch network 154 of operator assistance system 2 (the remote system).

Subsequently, when the operator has indicated that the connection to the called customer is to be established, connection 323 between line 120 and outgoing trunk 130 is added to the existing connection between line 120 and operator position 160. In the illustrative embodiment described herein, the circuit switching networks 104 and 154 are digital networks. The systems are equipped with well known digital coinference circuits, considered for clarity to be part of these circuit switching networks, which allow three-way connections to be set up. This permits a third leg, such as the connection to an outgoing trunk, to be added to an existing connection.

In addition to the voice path between the incoming line and the operator position, described above, a data path to operator position 160 must be established. In the present embodiment of the invention, this data path includes a data path 307 in packet switch network 155 between processor 151 and operator position 160. The total control mechanism must be augmented, as described below, by a data path between processor 101 of the local system and processor 151 of the remote system. This data path includes data path 301 through packet switch network 105, data communication path 140, and data path 309 through packet switch network 155.

Processing of the exemplary call begins when a seizure is initially detected on line 120. Under the control of processor 101, signaling information (the dialed number) is accumulated and stored in memory as for a conventional call. When complete signaling information has been obtained, processor 101 recognizes, as for a conventional call, that the assistance of an operator is required, and enters a request into a queue 420 (FIG. 4) in memory as for a conventional call. Audible tone is sent back to the originating customer to let that customer know that a connection to an operator is being attempted.

At some later time, the queue 420 (FIG. 4) is examined by processor 101. Here, a departure is made from the processing of a conventional call. Because operator assistance system 1 is in the right transfer mode, processor 101 makes a decision that an operator position in system 2, the remote system, is to handle the operator intervention. Processor 101 transmits to processor 151 a call request data message 500 (FIG. 6), which summarizes the pertinent known data about the call. This data message is sent via the packet switching networks 105 (data path 301, FIG. 3) and 155 (data path 309, FIG. 3) and data communication path 140. Processor 151 records this data in its own memory.

In the remote system (operator assistance system 2), when an operator position becomes available, path 325 (FIG. 3) is set up in circuit switching network 154 between an operator connecting trunk, in this case trunk 125, and an operator position, in this case operator position 160. Processor 151 sends to processor 101 a remote setup complete message 510 (FIG. 6). In response, path 321 (FIG. 3) is set up in the local system in circuit switching network 104 between the incoming line 120 and an operator connecting trunk 125. Processor 151 sends a conventional initial display control message, based on the data previously received from processor 101, via packet switching network 155 to operator position 160 to control the display of initial call data on display 202 at that operator position. The operator at operator position 160 communicates with the customer on line 120 and keys conventional data which is sent to processor 151. Processor 151 records data about the call (such as a calling card number) or transmits control data to processor 101 to change the configuration of the call (such as a request to set up the call to a distant switch). At the end of the operator transaction, processor 151 disconnects operator position 160 from operator connecting trunk 125 and sends a disconnect message 550 (FIG. 6), comprising all pertinent call data collected by processor 151, to processor 101; in response to this message, processor 101 updates its call records, makes any necessary billing entries in its memory, and disconnects operator connecting trunk 125 from the connection between incoming line 120 and outgoing trunk 130.

Using an alternative program, processor 151 can defer the disconnect of the operator position until the processor receives a message from processor 101. This alternative program offers the possibility of retaining the connection to the customer if processor 101 recognizes a need, such as the unavailability of voice announcement circuits, for retaining an operator on the connection.

The consequence of this mode of operation is that the calls between an originating customer or incoming trunk and a terminating customer or outgoing trunk are set up in the conventional manner within operator assistance system 1 (the local system), but that an operator position in system 2 (the remote operator position) is used to serve an operator assistance request. The remote operator position communicates with the processor of the remote system (the remote processor). In addition, the processor of the local system (the local processor) sends an initial call request message to the remote processor comprising data concerning the call so that the remote processor may set up a connection to a remote operator position and may control the initial operator position display; the remote processor sends to the local processor a remote setup complete message 510 comprising the selected operator connecting trunk, and a final disconnect operator position message comprising data which has been accumulated by the remote processor from communications with the remote operator position. Further message exchanges between these two processors are required where the remote processor does not have access to data, available to the local processor, or requests the local processor to perform intermediate call control operations.

The mode of operation described above is useful in four distinct settings. First, if all local system operator assistance requests are served by operator positions at another system, this mode of operation can be used for operator position centralization. Second, if operator positions in the local system are unattended at night and/or on weekends, then this mode of operation can be used to implement night transfer. Third, this mode of operation can be used to handle temporary peaks of traffic in one system by allowing dynamic interflow of operator assistance requests to another system which does not have a simultaneous peak; this other system may interflow operator assistance requests in the reverse direction when the traffic peak situation is reversed. Finally, if certain types of operator assistance requests are handled by operators only available in another system, all such requests can be served by such operators by static interflow.

Each of the processors 101 and 151 contains a set of call processing programs, the pertinent ones of which are outlined in the program flow diagrams of FIGS. 7–11 and 13, for controlling operator assistance calls and operator assistance requests and for allocating a request to a local or a remote system. In addition, each of processors 101 and 151 has a stored program called an operating system for controlling scheduling and the transmission and reception of messages among processes in one or more processors. Operating systems are well known and commonly used in the art. One such is the Duplex Multi-Environment Real Time (DMERT) operating system, described in Grzelakowski et al.: DMERT Operating System, Bell System Technical Journal, Vol. 62, No. 1, Part 2, January 1983, pp. 303–322. According to common practice in many operating systems, each job or process in a system is identified by a process number. Each active process has an assigned block of memory called a process block. The operating system maintains a list of all active process numbers and is able to find the location in memory of the process block for any process number. By using the program facilities of the operating system, one process communicates with another by sending a message, whose transmission and reception is handled by the operating system, to a destination process in the same or a different processor.

Figure 4:
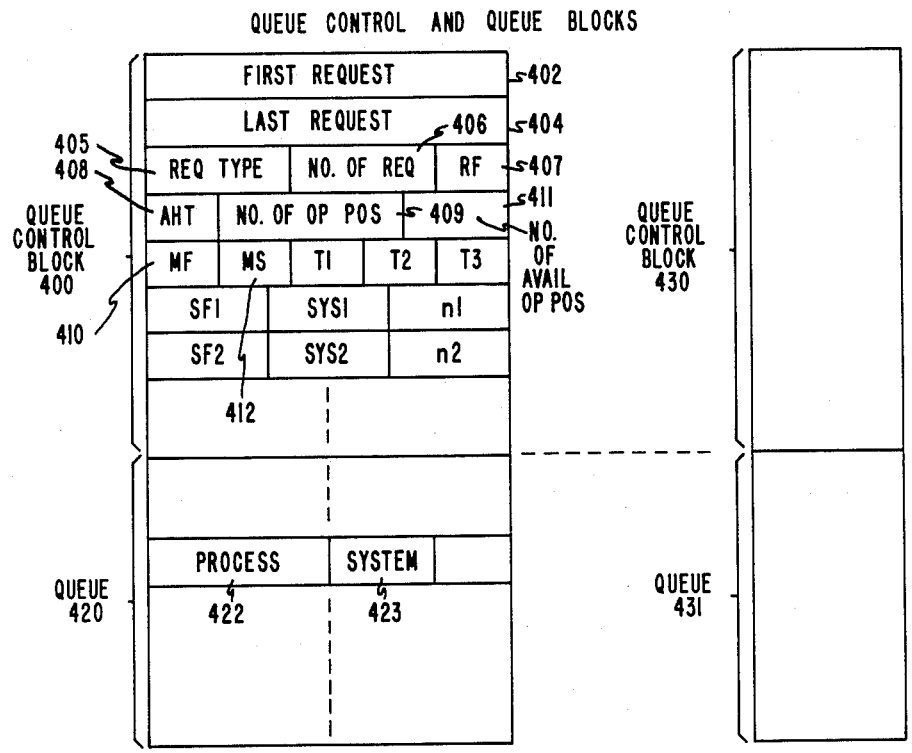
FIG. 4 is a memory layout of a queue used for storing operator/assistance requests.

Further details of the processing of the call can best be understood by reference to FIGS. 4–13 which show memory layouts, inter-processor message formats and program flow diagrams. Queue 420 (FIG. 4) uses a well known fifo (first in, first out) queue discipline which has the characteristic that the most recently entered request will be the last to be served. Each request for a connection to an operator position is stored in the queue as a process number. This number acts as link to a block of memory, called the process block, (described below with respect to FIG. 5), which contains all pertinent information about the process, in this case, an operator assistance call. Each operator assistance system has one or more queues, each associated with a team of operator positions. FIG. 4 shows two such queues 420 and 431 each with its control block 400 and 430, respectively. Each queue is defined by a call type indicator 405, indicating the operator assistance request type.

Different operator teams may serve different types of operator assistance requests. For example, a different team might be used for international calls than for toll and assistance calls within one country. Some teams may serve requests from more than one queue, although it is assumed for clarity herein that each operator team only serves one queue. Techniques for allotting operator positions from one team to more than one queue are well known in the art and are generally based on the principle of keeping delay, relative to a target maximum for each queue, equal in the several queues served by one team.

The queue control block 400 (FIG. 4) associated with queue 420 contains a first request indicator 402 and a last request indicator 404 to control the loading and unloading of the queue in a well known manner. It also contains a variable 406 indicating the number of entries in the queue, and a parameter, the average holding time (AHT) associated with a request in that queue, stored in field 408. Variable 406 and the AHT are used to estimate the delay to be encountered by the next entry in the queue. The queue control block also includes a request type indicator 405, described above. The control of the queue control block also maintains a count of the number of active operator positions 409 in the team that handles the call type of this queue control block, by incrementing the number whenever an operator opens an operator position and decrementing the number whenever an operator closes an operator position. The control of the queue control block also maintains a count of the number of available operator positions 411 by incrementing this number whenever a position is released and decrementing it whenever a position is seized. Also stored are three time thresholds T1, T2 and T3 whose use is discussed hereafter with respect to the dynamic interflow feature. In addition, queue control 400 contains master flag MF (field 410) which is marked if all requests in the queue are to be served by operator positions in another system. This flag is marked in the assumed case of night transfer of all operator assistance requests to another system. That other system, in this case, operator assistance system 2, is identified in the master system (MS) parameter stored in field 412.

A remote call in one system is a local call, using a remote operator position, in another system. The queue 420 stores requests for remote as well as local calls. To accommodate both local and remote calls, each request, such as the request shown in queue 420, contains a process number 422 (a link to the process block 450 (FIG. 5) containing call data) and a local system number 423, the latter used to identify the local system of a remote call. For the exemplary call, system 1 is the local system and system 2 the remote system. The process number 422 is always a link to a process block of the system in which the queue is stored, i.e., the local system for a locally entered request and the remote system for a request entered from another system.

Figure 5:
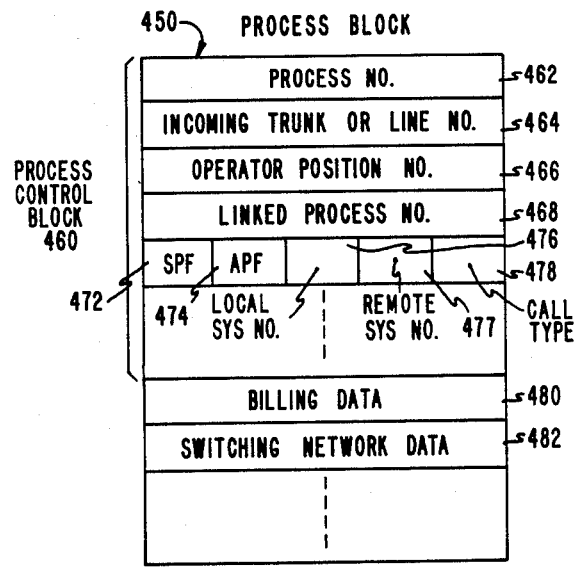
FIG. 5 is a memory layout of a process block used for storing the data of an operator assistance call.

FIG. 5 shows a typical process block 450, one of many such that are present in each system, when that system is processing many calls. Each process block contains pertinent information required to control a call. Such process blocks are used in prior art systems. In the case of the exemplary call under discussion, each of the operator assistance systems 1 and 2 has a process block for that call. The process block for the remote system (system 2) is active only during the time that the operator assistance request is awaiting service or being served in the remote system. Process control block 460, within process block 450, contains a process number 462 used to identify the process. The process control block also contains the identification of the incoming trunk or line number 464; the associated operator position number 466; the number of any linked processes 468 (such as the process controlling the operator position at the remote operator assistance system); flags SPF (sending process flag) 472, set when the call is local to this system but the operator position is remote, and APF (accepting process flag) 474, set if the process block is for the remote system; local system number 476 and remote system number 477 to identify the local and remote systems for the call associated with the process block; and a call type indicator 478. In addition, the process block contains general data about the call, such as billing data 480 and circuit switching network data 482 which describes the call configuration.

FIG. 6 shows the layout of messages exchanged between the processors of cooperating operator assistance systems in setting up a call using a remote operator position. Call request message 500 is used to transmit call data to a remote system requesting that system to connect an operator position of that system. The request includes a message type 501, the local process number of the call 502, the local system identification 504, and the remote system identification 505. The message type field is used in connection with this or any other message by the operating system of the receiving processor to initiate the appropriate program process to handle any received message. The local process number is used subsequently to locate the process block associated with the call of the message. The local and remote system identifications are used to route the message and to inform the remote system of the identity of the local system to be stored in location 476 of process block 450 (FIG. 5) when that block is initialized in response to message 500. In addition, message 500 includes a request type field 506 to identify the type of operator assistance request and hence the queue to be used in handling this call. The request message also includes a data field 508 to pass conventional call data collected by the local system to the remote system. This data is used to initialize a process block in the remote system, and, subsequently, to control the sending of an initial display control message to a connected operator position.

A remote setup complete message 510 is transmitted by the remote system when it has established a connection between an operator position and one of the operator connecting trunks interconnecting the local and the remote system. The remote setup complete message includes the message type 511; the local process 512 and system 514 numbers for routing the message; the remote process 516 and system 518 numbers for subsequently locating the process block in the remote system (the remote process number is stored in location 468 of process block 450 (FIG. 5)), and the identification of the operator connecting trunk 520 and operator position 522 to be stored in locations 482 and 466 of process block 450 (FIG. 5) in the local system. In response to the remote setup complete message, the local system removes audible tone to the originating customer. Finally, a local setup complete or confirmation message 530, sent by the local system to the remote system in response to the remote setup complete message includes the message type 531; the local process number 532 and system number 534; and the remote process number 536 and system number 538. This message simply confirms that a proper response was made by the local system to message 510, and contains no new data. Intermediate message 540, sent by either system after the confirmation message but before a disconnect operator position message, includes the message type 543; local process number 542 and system number 544; remote process number 546 and system number 548; and data, tailored to the specific action of the intermediate message. Disconnect operator position message 550 is sent when the remote processor receives an operator position disconnect request from the remote operator position. It includes the message type 555; local processor and system numbers (551,552); remote process and system numbers (553,554); and data 556 (such as a calling card number) accumulated by the remote processor.

FIGS. 7-10 are flow diagrams of programs for loading and unloading the queue, and for responding to requests unloaded from the queue. Requests are loaded into one of the queues 420, . . . ,431 when the call processing program detects the need for operator assistance, i e., an operator assistance request (action box 756, FIG. 7), and identifies the type of operator assistance request (action box 757). The call processing program then causes a request, comprising the number of the process controlling that call and the system number, to be entered in the queue for that type of operator assistance request (action box 758, FIG. 7). The queue is selected on the basis of the call type indicator 478 stored in the process block 450 of the call and updated in a conventional manner as the customer provides information by dialing. A request entered into queue 420 (FIG. 4) includes the process number 422 and the system number 423 With the exception of the entry of the system number as part of the request, the process of recognizing the need for operator assistance and entering a request into the proper queue is the same as for a conventional call in a prior art system. The system number is needed to identify a remote request (see description of test 713, FIG. 8, below).

At some later time, determined by a scheduler that is part of the operating system, the queue 420 (FIG. 4) is tested in a conventional manner (test 710, FIG. 8) to see if there are any requests in the queue. If not, other work is resumed (action box 712). Otherwise, test 713 tests the next request to see if the request is local, i.e., whether the system number 422 (FIG. 4) of the request is the system number, stored in a standard location when the system is initialized, of this system. If the request is a local one, the master flag MF 410 (FIG. 4) is tested (test 714). If this flag is set, all requests in the queue are served by operator positions at a remote operator assistance system; this flag is set, for example, when night transfer is activated. For the present, we are assuming that the night transfer feature has been activated and the MF flag is set to 1; therefore, a call request message 500 (FIG. 6) is sent (action box 724) to the remote system.

The call request message 500 (FIG. 6) contains the local process (502) and system (504) numbers obtained from fields 422 and 423 of the request in queue 420 (FIG. 5); the remote system number 505, obtained from the master system MS field 412 of the queue control block 400 (FIG. 5); a message type indicator 501, derived here, as elsewhere in this description, from the character of the program being executed when a message is generated; the type of operator assistance request 506, obtained from request type 405 of queue control block 400; and call data 508 containing all data, previously stored in process block 450, required to control a conventional operator display and to respond to conventional requests keyed in by the operator. This message is received by processor 151 of the remote system 2 (action box 800, FIG. 11), which then initializes a process block (action box 802, FIG. 11) with data obtained from call request message 500 for further controlling this operator assistance request in the remote office. The processor 151 of the remote system 2 then makes an entry (action box 804, FIG. 11) in its own queue 420 (FIG. 4) comprising the remote process number 422 and the local system number 423 so that a connection to an operator position may subsequently be set up in the remote system. Further processing of the call, as it is processed in operator assistance system 2, is described below with respect to the processing of a remote request (FIG. 11).

Consider now the case in which night transfer is not active. If the master flag is not set and none of the send flags SF1,SF2, . . . , whose purpose is discussed hereafter with respect to dynamic interflow, are set (test 716, FIG. 8), test 750 (FIG. 9) which tests for availability of active operator positions, is carried out. A test for availability of an active operator position is similar to a test for availability of a trunk or service circuit; techniques for maintaining such availability status are well known in the art. If no positions are available, actions associated with dynamic interflow (FIG. 10), to be described hereafter, are performed. If an active operator position is available, a conventional operator assistance connection is set up: a local connection to the operator position is set up and an initial display control message is sent to the position (action box 752, FIG. 9) in the conventional way (local system only) of handling an operator assistance request. Subsequently, the queue processing loop is reentered at test 710 (FIG. 8).

If the result of test 713 (FIG. 8), described above, indicates that the request is not a local request, then this system is the remote system for this request. This signifies that the request was placed in this queue upon receipt of a call request message from another operator assistance system (FIG. 11, action boxes 800, 802, and 804). Then test 768 (FIG. 9) tests for the availability of an active operator position. If none are available, the queue processing loop is reentered at test 710 (FIG. 8) so that if there are more requests in the queue, the tests associated with local system requests may be performed before servicing of the queue is completed. If an active operator position is available, a test is made (test 770, FIG. 9) to see if there any available operator connecting trunks to the local system of that request. If none are available, the queue processing program is reentered at test 710 (FIG. 8) for the same reason discussed immediately above. If an operator connecting trunk is available, (this is the situation encountered in system 2 in processing the exemplary call following the reception of the call request message from the system 1), the operator position and connecting trunk are connected and a conventional initial display control message is sent to the operator position (action box 772, FIG. 9). The voice connection to the operator position (operator position 160 in the exemplary call) is set up in circuit switch 154 and the initial display control message is sent from processor 151 via data switch 155. A remote setup complete message 510 (FIG. 6) is sent (action box 774, FIG. 9) to the local system. (This message is sent in the exemplary call example from processor 151 via packet switch networks 155 and 105 and via data transmission facility 140 to processor 101 of the local system (system 1).) The queue control program then reenters the queue processing loop by repeating test 710 (FIG. 8) to see if there are any further requests in the queue.

Figure 9:
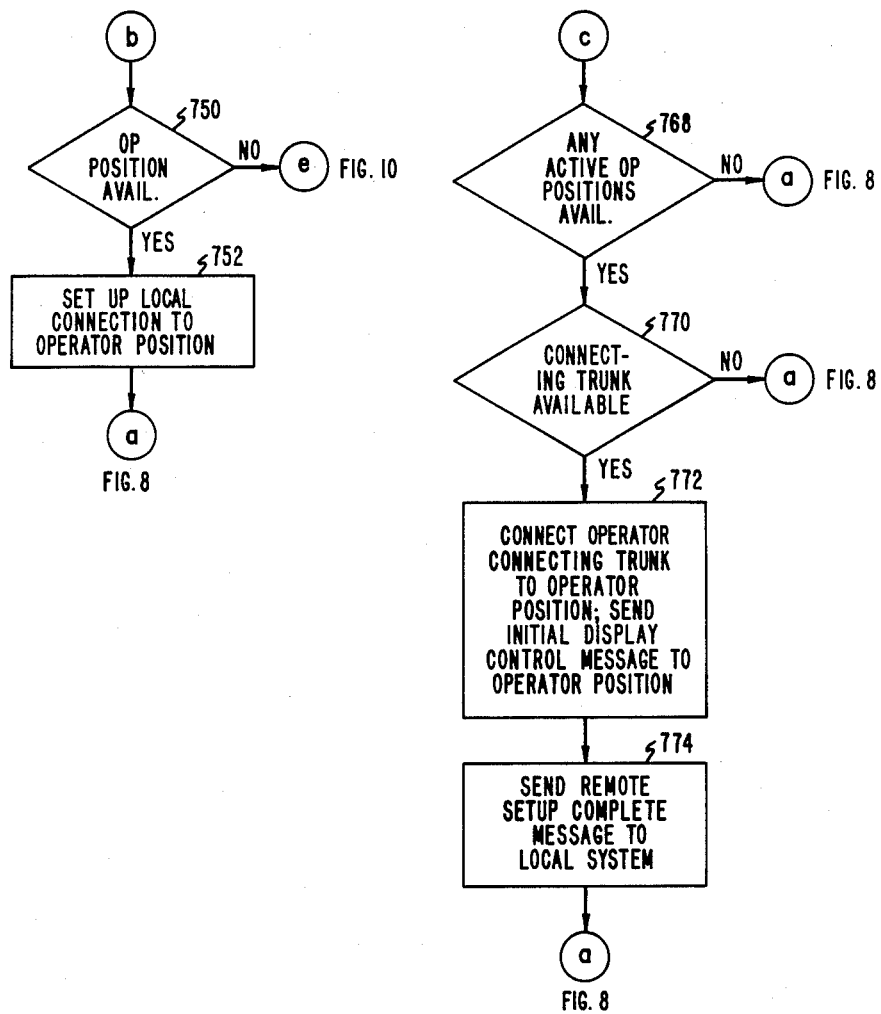
Figure 10:
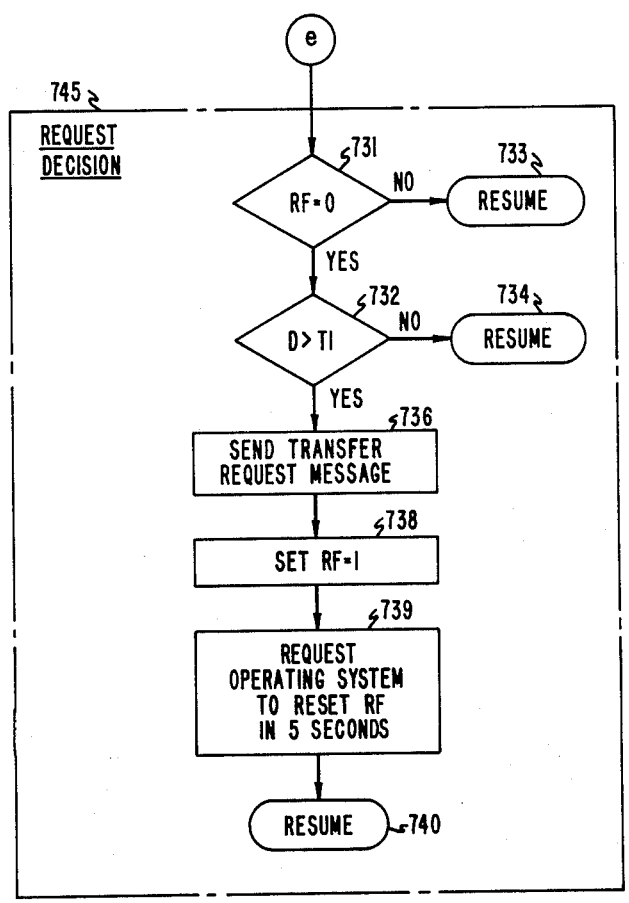

FIG. 11 consists of a group of flow charts illustrating the program for handling different phases of a remote call. The response (action boxes, 800, 802 and 804) by a remote system to a call request message has already been discussed with respect to call request message 500 (FIG. 6), as has the processing of a remote request in a queue (action boxes 772 and 774 FIG. 9 discussed in the previous paragraph). Action boxes 812, 814, and 816 illustrate the actions required to be performed in the local system upon receipt of the remote setup complete message 510 (FIG. 6) sent in action box 774 (FIG. 9). The message is received in the local system (action box 812). A connection is set up (action box 814) between the operator connecting trunk specified in field 520 of message 510 and the incoming line or trunk stored in location 464 of process 450 (FIG. 5). This allows the operator at the remote operating position to communicate with the originating customer. Next, the local system sends a local setup complete message 530 (FIG. 6) back to the remote office to confirm that the requested actions have been completed (action box 816).

In the example call being considered in this case, a person-to-person call, no connection has been set up from the originating customer to the terminating customer at the time the operator assistance request is recognized, so that the initial connection to the operator position is simply to the incoming line or trunk. However, in the case of other operator interventions such as an operator request for coin overtime deposit, a connection may already be established in which case the operator simply bridges onto that existing connection. For an operator assistance request served from a remote operator position, this is accomplished by bridging the operator connecting trunk onto that existing connection. A locally served operator assistance request of this type is processed conventionally.

In the case of a person-to-person call such as the exemplary call, after the operator has communicated with the originating customer and recognized that a person-to-person call is to be set up, the operator keys a request asking that the call be set up and that the operator remain connected to the call after such setup. This request is received in processor 151 of the remote system (action box 840). A test (test 842) is made to see whether this request has been made for a locally processed call (i.e., one in which the operator position is in the operator assistance system in which the operator assistance request was detected). If this is a locally processed call, the conventional call setup functions are performed (action box 844). If not, an intermediate message 540 (FIG. 6) is sent to the local system (system 1) requesting that a call be set up and that the operator position continue to be connected to the call (action box 846). In this case, data field 541 specifies only the type of the request conveyed by the message since all necessary data is available in the process block 450 (FIG. 5) of the local system.

In response to the receipt of message 540, (action box 850), local system 1 sets up the requested call via outgoing trunk 130 (FIG. 1) while retaining the connection (action box 852) between the originating customer and the operator connecting trunk 125, connected in operator assistance system 2 to the operator position 160. The call can be set up in the local system because the initial data dialed by the originating customer has been retained in the process block controlling the call in operator assistance system 1. The operator position is bridged onto the connection between calling and called customers.

After the call from the calling customer to the called customer has been set up, which may require connections in other switches besides operator assistance system 1, the operator verifies that the requested called individual is now on the phone and that the person-to-person call has therefore been satisfactorily established. At this point, the operator keys a conventional request to be disconnected from the customer connection and to start charging for the call. The response to the operator request is illustrated in FIG. 11 in the program sequence starting with action box 860 in which a processor (processor 151 in this case) receives this request. In test 862, a check is made whether this is a call being served by an operator position at the same system as the incoming call, i.e., a local operator position. If so, the conventional operator disconnect operations are completed (action box 863). If not, (as in the case of the exemplary call), the remote operator is disconnected from the operator connecting trunk (action box 864) and a disconnect operator position message 550 (FIG. 6) is sent to the local system (action box 866). This disconnect operator position message includes all pertinent data gathered by the operator, keyed into the operator position, and stored in the process block 450 of the remote system. In the exemplary call, this data would include the identification of the type of charge (person-to-person) and the time when charging begins. If the call is a credit card call and the customer has verbally supplied the calling card number to the operator, that number, which would have been keyed by the remote operator, would also be part of this data. The operator position is then made available (action box 867) and other work can be resumed (action box 868) by the associated processor (processor 151 of the remote system in this case).

The disconnect operator message 550 (FIG. 6) is received in the processor (processor 101 for the exemplary call) of the local system (action box 870, FIG. 11). Based on the message type 555, indicating the requested action and the local process number 551, indicating where the local process block 450 which contains the pertinent data is to be found, the operator connecting trunk specified in block 482 of process block 450 is disconnected from the call connection (action box 872). The data 556 in message 550 is combined in the local system with other call data in the process block 450 of the local system in order to update the billing records associated with that call (action box 873). For the exemplary call, the updating process records as for a conventional call that this is a person-to-person call and records the time at which the operator indicated charging might begin. Finally, other work is resumed (action box 874) by the associated processor (processor 101 for the exemplary call).

The person-to-person call has illustrated the use of an intermediate inter-processor message 540 (FIG. 6) to change the call configuration. For certain other calls, intermediate messages are used by the remote processor to obtain data available at the local processor. For example, conditions may exist in which the originating customer at system 1 must provide that customer's directory number verbally to the assisting operator at system 2 and it may be necessary to check whether a certain type of operator assisted call is authorized for that directory number. The customer first provides the directory number verbally to the assisting operator. The assisting operator keys this number into the remote operator position 160 which passes this number to the remote processor 151 via packet switching network 155. Processor 151 then sends an intermediate message 540 to local processor 101 inquiring whether the requested operator assisted call from that directory number is authorized. The local processor 101 responds by providing the information requested. These interprocessor messages are transmitted using the intermediate message format illustrated in message 540 (FIG. 6), which includes the message type 543 to identify the program associated with the processing of that message, further data 541 (such as the directory number and an identification of the specific data request) needed to process the request, and the process and system numbers to allow the message to be routed and to allow the process block containing pertinent data to be located.

In the exemplary configuration used to described the illustrative person-to-person call, the remote operator position communicates with the processor of the remote system. As a result, whenever actions are required which change the configuration of the call or which require the operator to obtain data available only at the local system, a message is sent between the processors of the local and the remote systems. In an alternative configuration, in which delays for traversing packet switching networks are minimal, the operator position at the remote system communicates directly with the processor at the local system. In this alternative configuration, the data path 305 (FIG. 3) from data communication path 140 (connected to processor 101 via data path 301) to operator position 160 via packet switching network 155 is used. Both processors must still cooperate to set up the voice connection to the remote operator position and to disconnect that connection in the manner referred to earlier herein, but other interactions are minimized and the amount of data that must flow between the two processors is also minimized. Further, the control software of the system is simplified. In the illustrative person-to-person call, the local processor can directly initiate the setting up of the customer call without the requirement for an intermediate message; therefore test 842 and action boxes 846, 850 and 852 can be eliminated since only action box 844 is needed. For the case of data available only to the local processor and requested by the remote operator position, as in the above example requesting authorized data, the data may be fetched directly by the local processor without requiring an exchange of messages between local and remote processors.

The present embodiment of the invention can also be used for static interflow, i.e., operator centralization for one type of operator assistance request. (This is equivalent to permanent night transfer for that type of request). For example, system 2 may have a specialized team of operators for handling calls of a certain type, such as international calls, which none of the operators associated with system 1 can handle. Under these circumstances, the master flag MF 410 would be set for the queue for such requests, and the master system MS 412 would be set to the identification of system 2. Then, all such operator assistance requests detected in system 1 would be served by operator positions in system 2. Further, there are other situations in which special subcategories of calls may always be served by different operators. For example, if an operator assistance request is served by an operator in system 1 and the operator in system 1 recognizes through conversation with the customer that a Spanish speaking operator is needed to serve this request, the operator in system 1 can make a request that this operator assistance request be served by an operator that is a member of another team. Members of this other team may only be available at operator assistance system 2. Under these circumstances, all such calls would be served using operator positions at system 2. Operator assistance system 1 would have a queue for such calls to permit the same control programs to control these calls.

Dynamic Interflow

Dynamic interflow allows traffic to flow to operator positions in any one of several different remote operator assistance systems according to traffic conditions as they vary from moment to moment in the local and remote systems. The objective is to permit operator positions in systems which do not have a heavy load of operator assistance requests to accept operator assistance requests from other operator assistance systems which do have a heavy operator assistance request load. In the description, it is assumed that system 1 is overloaded and sends operator assistance requests to system 2; because the configuration is symmetrical, the heavily loaded or overloaded system could also be system 2 which would send operator assistance requests to system 1. This arrangement is then extended in the description accompanying FIG. 14 to arrangements involving more than two operator assistance systems. The program flow charts of FIGS. 8 and 10 and the queue control block 400 (FIG. 4) are arranged to accommodate more than two systems.

To handle dynamic interflow, each system has means for measuring the level of operator assistance request load for each queue relative to the number of active operator positions for the team serving that queue, and for detecting a load condition (overload) which cannot be handled without a degradation of service in an operator assistance system. When such overload is detected in a local system, a transfer request message 570 (FIG. 12) is sent to one or more remote operator assistance systems each of which examines its own level of load of operator assistance requests to see whether it can in fact accept any of the traffic from the other system. If so, the remote operator assistance system sends a transfer permit message 580 (FIG. 12) comprising traffic control data specifying how many operator assistance requests it will accept. During periods of extended overload in one local system, repeated transfer request and transfer permit messages are exchanged. This type of arrangement protects service at the remote system while offering the facility for using any available capacity in the remote system for serving overload calls in the local system.

FIG. 12 is a layout of the messages used for controlling the transfer of calls to be handled by operator positions at remote operator assistance systems. Message 560 is a message to transfer or to cancel the transfer of all operator assistance requests of a particular call type, including a universal call type used for transferring all operator assistance requests. This message, using the universal call type, is used, for example, for activating or revoking night transfer. The message specifies the message type 561, the type of operator assistance request 562, and the identity of the local system 564 and remote system 566. Two message types are used, one for initiating a transfer, the other for canceling the transfer; the message type acts as an indicator to differentiate the cancel from the initiation. The type of request is specified in order to handle situations in which there are a number of queues for handling different types of requests. Thus, it is possible to transfer all requests of one type without affecting the other types of requests. This is done in the static interflow case. Message 560 may be generated from a supervisor's terminal attached to a network that has access to the controlled system, system 1 in this case. Alternatively, message 560 can be arranged to be generated internally according to a predetermined schedule, so that night transfer is automatically invoked at night and/or on weekends.

In order to activate or cancel night transfer or static interflow, an all requests transfer/cancel transfer message 560 is sent to the local system. The message is received (action box 902, FIG. 13) and in response, the master flag (MF) (field 410, FIG. 4) is set (transfer) or reset (cancel transfer) (action box 904, FIG. 13) according to the message type field 561 (FIG. 12).

Messages 570, 580 and 590 are used for dynamic interflow. Transfer request message 570 is generated by an operator assistance system which has recognized overload in one type of operator assistance request and requests that a remote system accept some operator assistance requests of the type whose overload has been recognized. This request identifies the type of message 571, the type of operator assistance request 572, the requesting (local) system 573, and the requested (remote) system 574. Transfer permit message 580 is sent in response to a transfer request message and specifies the message type 581, type of operator assistance request whose transfer is being permitted 582, the number of requests, n, for which permission to transfer has been granted 584, and the identifications of the local system 586 and remote system 588. A transfer permit message with n (field 584) set to zero is a permission-denied message, since permission is granted for zero requests.

The overload detection program 745 (FIG. 10) for making the decision to generate a transfer request message 570 will now be described. In test 750 (FIG. 9, previously described), a check is made for the availability of an operator position to handle a specific operator assistance request type in the local system. If no operator position is available, a check of a request flag RF of the queue control block (field 407, FIG. 4) is made (test 731, FIG. 10). This request flag is used to insure that a test for overload is not performed repeatedly and unnecessarily. If the request flag is set, this is an indication that a test for overload has previously been performed and that it is not necessary to reperform this test now. In that case, other work is resumed (action box 733, FIG. 10). If the request flag is not set, a check is made (test 732) to see if the estimated delay for the most recent entry in the queue exceeds an upper threshold T1, whose value is stored in the queue control block (400, FIG. 4). This upper threshold T1 is a parameter selected by the operating management of the operator assistance system and can be altered when necessary by a supervisory operator or traffic supervisor via a message. The threshold T1 is selected so that satisfactory service can be provided as long as that threshold is not exceeded. Therefore, if the estimated delay is not greater than that threshold, the serving of the operator assistance request can be deferred and other work can be resumed (action box 734). If the estimated delay exceeds the T1 threshold, then a transfer request message 570 (FIG. 11) is sent to one or more remote systems (action box 736, FIG. 10) and the request flag is set (action box 738, FIG. 10). The operating system is requested to reset the RF flag after a period of time, e.g., five seconds (action box 739) in order to allow a new transfer request to be handled after that time. Five seconds is chosen as a compromise to avoid sending excessive transfer request messages but to permit new transfer requests to be handled within a reasonable time. Other work can then be resumed (action box 740, FIG. 10).

In this embodiment of the invention, the estimated delay is used as a message of level of load. The delay is computed by dividing the number of calls in the queue 406 by the number of active operator positions 409, and multiplying that quotient by the average holding time 408 for the type of request stored in this queue. An alternative arrangement is to record the time that each entry is loaded into the queue and to see how long the oldest entry has been in the queue by subtracting the time of that entry from the present time. Such methods are well known in the art. Overloads generated by a surge of traffic are detected more rapidly by the calculation estimation technique.

When a remote system receives a transfer request message 570 (FIG. 12) (action box 920, FIG. 13), the remote system estimates its own delay. The remote system checks (test 924) whether this estimated delay exceeds a threshold T2 whose value is stored in the queue control block 400 (FIG. 4). In each system, threshold T2 is selected to be lower than the threshold T1 and represents a value at which the remote system can accept additional traffic. If the estimated delay is less than T2 and the remote system is therefore able to accept additional traffic, it generates a quantity n to indicate how many operator assistance requests can be accepted immediately. If the estimated delay exceeds T2, then the remote system will deny the request by setting the quantity n (field 584, FIG. 12) to zero (action box 926). In either case, the remote system then sends a transfer permit message 580 (FIG. 12) including the calculated parameter n of the number of operator assistance requests that can be accepted to the local system (action box 930) and resumes other work (action box 934).

In this specific embodiment of the invention, the quantity n is calculated to represent the number of operator assistance requests which can be accepted without increasing the estimated delay beyond an intermediate threshold T3, also stored in the queue control block, whose value is between T1 and T2. This calculation is performed in action box 928. This quantity n is the product of T3 times the number of active operator positions 409 (FIG. 4), divided by the average holding time 408, less the number of requests 406 already in the queue of the remote system, plus the number, if any, of available active operator positions 411. However, the value of n is also limited by the number of available operator connecting trunks connecting the remote to the local system, and is further limited to a maximum value selected by the operating management of the operator assistance system based on the total number of such operator connecting trunks. The number of operator connecting trunks and available operator connecting trunks is maintained within the operator assistance system using well-known methods of maintaining records of trunk groups and available members of trunk groups.

Operator connecting trunks represent a resource which all queues of the system must share. This factor must be taken into account in generating n when transfer request messages associated with several queues are received within a short period of time. By setting relatively low limits to n, or by progressively lowering these limits during an overload period, and letting them rise as the overload disappears, the remote system can be made responsive to such a situation to share the use of the operator connecting trunks. Alternatively, the number of such trunks can be made relatively large to minimize the probability that they will be a bottleneck in limiting the sharing of operator positions.

In response to reception of the transfer permit message 570 (action box 946), the local system first tests the value of n in the received message (test 947). If n is not greater than zero, the local system simply resumes other work (action box 949) because the request has been denied by the system which sent the message. If n is greater than zero, the local system sets the send flag SF corresponding to the system which transmitted the message in the local queue control block 400 (FIG. 4). This allows the local system to send operator assistance requests to be served by the remote system. The local system further initializes the counter associated with that remote system to n, the parameter of the transfer permit message (action box 948). Each queue control block 400 (FIG. 4) of a local system has a send flag (SF1,SF2, . . .), remote system identification (SS1,SS2, . . .), and permitted number of operator requests to be transferred (n1,n2, . . .) for each remote system to which such requests may be sent. As a result of this interchange of messages, the local system is now informed that up to n operator assistance requests may be sent to the remote system specified in the transfer permit message.

In this embodiment, two types of flags, MF and SF are used. However, if the MF flag is set, then the SF flags are ignored. Otherwise, the associated SF flag is the only flag used for a given remote system. Other flag arrangements are also possible, such as an arrangement which permits fractional sharing of the operator assistance requests among two or more remote systems in a static interflow arrangement.

The implementation of the sending of such operator assistance requests is further specified in the queue control program (FIG. 8). The requests to be sent to the remote system are already in the queue. When the queue is examined (at test 710), if one of the send flags which are tested in test 716 is set, the queue delay of the local office is estimated and tested (test 720) to see if it is still necessary to transfer operator assistance request load to a remote operator position. If the value of the estimated delay exceeds T2 (test 720) then the value of n is decremented by one (action box 721). The new value of n is tested (test 722); if it is now no longer greater than zero, the corresponding send flag (SF) is reset (action box 723) since no more operator assistance requests may be sent to that system until a new transfer permit message from that system is received. A call request message is sent to the remote office (action box 724). In response to this call request message, the operator assistance request should be entered at the beginning of the queue of the remote system, since the associated operator assistance request has already experienced delay in the local system.

The loop for examining the local queue is then reentered at test 710. This loop is traversed a number of times until there are no unexamined requests in the queue and other work can be resumed (action box 712); until all send flags SF1,SF2, . . . , have been reset to zero; or until the value of estimated delay goes below T2. If the delay found in test 720 described above is not more than the secondary threshold T2, no more calls are sent to the remote system, the request flag RF 407 and all send flags SF1,SF2, . . . , are reset (action box 726). Thereafter, or in case no send flags are found set in test 716, a test is made of availability of local operator positions (test 750, FIG. 9). If all send flags have been reset to zero, test 750 to check for availability of a local operator position is performed. If no operator position is available, the overload detection program 745 (FIG. 10), previously described, is executed, in order to detect the continued presence of overload. If an operator position is available, a conventional connection is set up to the local operator position (action box 752).

In this exemplary embodiment of the invention, the local system makes decisions on whether or not to send a call to a remote system and the remote system accepts all calls that are sent. The remote system controls the number of calls which it agrees to accept by sending transfer permit messages to the local office to send up to a specified number of calls. This arrangement protects service in each remote system while permitting substantial sharing of operator assistance request load in overload.

Using an alternative program, dynamic interflow can be implemented by limiting, over a longer period of time, the number (level) of simultaneous operator assistance requests which can be transferred whenever the estimated delay in a queue exceeds the T1 threshold. Advantageously, such an arrangement sharply reduces the number of transfer request and transfer permit messages exchanged between the two systems. To implement such an arrangement, it is necessary to maintain a count of the number of requests which are being served by the second system or to restrict the transfers to using a preselected operator interconnecting trunk subgroup. Then, dynamic interflow can be requested and initiated by a different type of request and permit message, which would be interpreted as representing the level, rather than the number, of operator assistance requests to be transferred. A transfer permit message of this second type could be sent from an operating supervisor's station when long term overload of a system is recognized. Such an alternative dynamic interflow arrangement could exist in a system which also offers the dynamic interflow arrangement described for the present embodiment of the invention.

Another alternative for implementing dynamic interflow is to set a send flag whenever the delay exceeds T1 and reset the flag when the delay goes below T2. Such an arrangement would require further facilities to allow a remote system to shut off transferred operator assistance requests.

For clarity, this description has concentrated upon a single queue. An operator assistance system may have a number of queues, such as queues 420, . . ., 431, each serving a different type of operator assistance request. The operator system may also have a number of operator teams. For clarity, it has been assumed that each team serves one queue. When an operator team serves several queues, an attempt is made to maintain equal estimated fractional delays, relative to the objective maximum delay for each call type. Thus, when one serving team is overloaded, all of its queues which have any requests have estimated delays in excess of their objectives, and requests are interflowed to another system in the same sequence in which they would be served, i.e., in such a sequence as to reduce the estimated delay, relative to the objective (T1) for that queue, proportionally.

Figure 14:
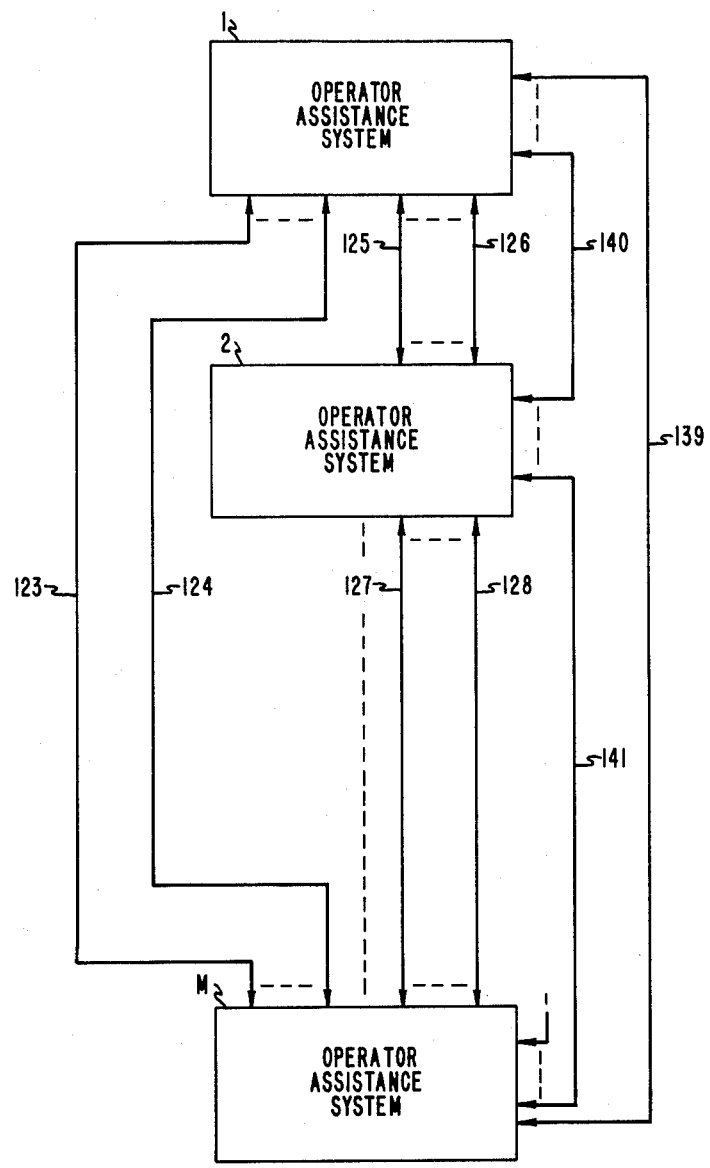
FIG. 14 is a block diagram showing a group of operator assistance systems interconnected to permit sharing of operator positions among these systems.

FIG. 14 shows a communication network in which there are M operator assistance systems, systems 1,2, . . .,M. Systems 1 and 2, previously shown in FIG. 1, are interconnected by data communication path 140 and operator connecting trunks 125, . . ,126. Systems 1 and M are interconnected by data communication path 139 and operator connecting trunks 123, . . .,124. Systems 2 and M are interconnected by data communication path 141 and operator connecting trunks 127, . . .,128. Other systems between 2 and M, not shown on the diagram, are also connected to these systems and to each other by operator connecting trunks and data communication paths, although the interconnection need not be complete. It is sufficient if every system in the communication network is connected to at least one other system. However, in case centralized control, described below, is used, each system must be connected to the control system via some data transmission facility.

In this communication network, either distributed control or centralized control of operator assistance request assignment can be used. In the centralized control arrangement, one of the systems, in this case system 1, is the control system. Each of the other systems 2, . . .,M periodically communicates the size of its queues, the number of its active operator assistance positions, the number of its available active operator positions, and the number of available operator connecting trunks to each of its connected operator assistance systems to system 1. This data is sent via a status message 590 (FIG. 12), which includes a message type indicator 591, a type of operator assistance request indicator 592, a count of active operator positions 594, available active operator positions 596, length of queue 598 and counts 599 of the number of available operator connecting trunks to other systems. Based on an analysis of these counts and queue lengths plus similar data obtained from within system 1, system 1 sends the appropriate transfer permit messages to each of the systems 2,. . .,M; these messages direct the receiving system to route a specified number of each type of operator assistance request to specified other systems. The analysis allocates traffic to equalize in all systems the estimated fractional delay with respect to T1 for each queue, but to limit delay due to accepted overload of an external system to the value of T3 in order to protect service in each system. The allocation of operator assistance requests to remote systems starts at a lower threshold than the value of T1 for the queue, such as zero or T2. The allocation is also limited by the number of operator interconnecting trunks. In response to these transfer permit messages and the calculations for system 1 traffic, systems 1,2, . . .,M place operator assistance requests to be served by operator positions in their own and other systems. In such an arrangement, there is no need for transfer request messages since the periodic summary messages 590 from each system accomplish the same purpose.

In an alternative centralized control method of operator assistance request assignment in a communications network, the control system keeps track of the length of all queues and the number of available active operator positions in all systems. Then, as each operator assistance request in the network is detected, the control system decides which of the operator assistance systems should handle that operator assistance request, and sends a message to the local system for that call indicating that system. Such an arrangement requires that data be exchanged for every operator assistance request and for every release of an operator position. Alternatively, such data could be sent for groups of requests and releases.

In the alternate distributed control arrangement, if one of the systems, for example system 1, is experiencing heavy load or overload, it sends transfer request messages to systems 2, . . .,M (but only those systems to which it is connected via operator connecting trunks), and, depending on the response to these messages, sends operator assistance requests to one or more of these other systems. The arrangements previously described with respect to FIGS. 4-13 can be used to implement this configuration. The different send flags (SF1,SF2, . . .) and number fields (n1,n2, . . .) (FIG. 4) keep track of which remote systems can accept which number of operator assistance requests; transfer request messages are sent to all connected systems prepared to accept the associated type of operator assistance request.

The communication network of FIG. 14 can also be used for providing static interflow, night transfer and operator centralization using the principles described with reference to FIGS. 1-13. Operator interconnecting trunks and data communication paths must be provided between any pair of the operator assistance systems, one of which serves operator assistance requests detected in the other.

Figure 15:
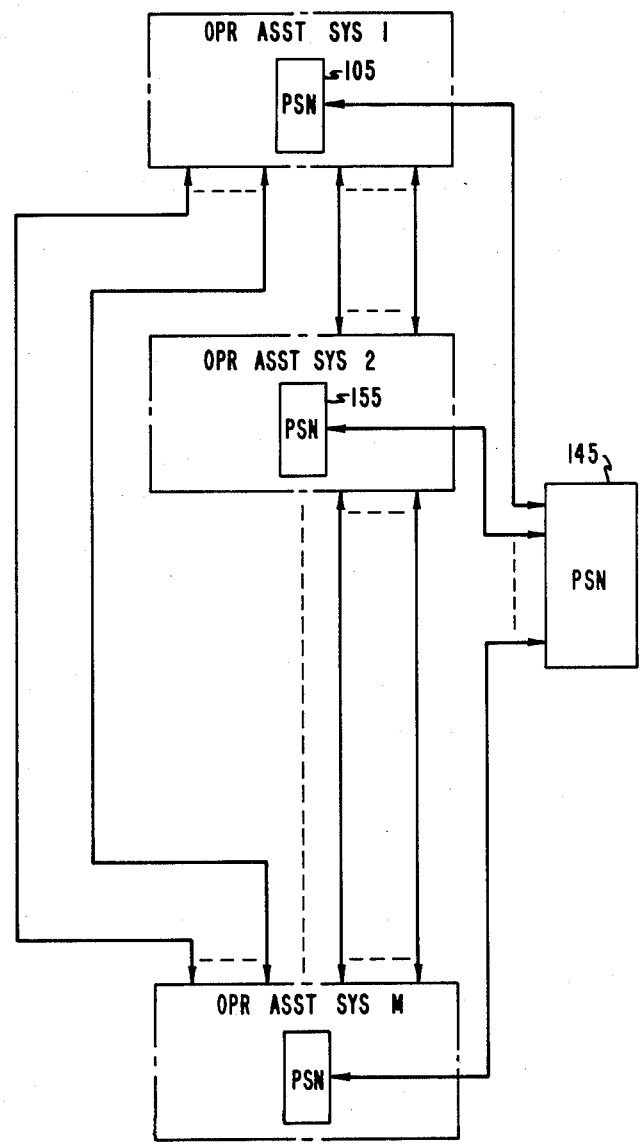
FIG. 15 is a block diagram showing the use of an external packet switched network to transmit data among a group of operator assistance systems.

FIG. 15 illustrates the use of an external packet switching network PSN 145 to switch intersystem data messages. Each of the operator assistance systems 1,2, . . .,M are connected to packet switching network 145 for the exchange of data messages. The systems are interconnected by the same operator connecting trunks shown in FIG. 14 for the voice communication between an operator and a customer. A packet switching network is more economical than a group of individual data communication paths such as path 140 (FIG. 1) if there is a large group of interconnected systems or if there is an added use for such a packet switching system. Alternatively, the special telephone signaling system used for the common channel interoffice signaling (CCIS) network can also be used to transmit intersystem messages. When a packet switching network or CCIS network is used, the delays of traversing such a network will help to determine whether a local or a remote system processor directly communicates with an operator position. If the delays are short, direct data communications between the local system processor and an operator position at the remote system are possible; as previously described, control software for such an arrangement can be implemented in a more straightforward manner.

While the operator positions 110, . . .,111 have been shown in FIG. 1 as being within the operator assistance system, it must be recognized that this is a topological diagram and not necessarily a physical diagram. The operator positions may be located physically at a remote location from the associated networks and processor, but are connected to that switch and controlled by that processor. For example, operator position 110 is controlled through data messages from processor 101 sent via packet switching network 105 and is connected to a line or trunk via circuit switching network 104. For some configurations, operator position 110 could also be controlled for remote operator assistance requests through data messages sent via packet switching network 105 from a remote processor such as 151.

Note that while the operator positions described herein are adapted to operate in an ISDN environment and communicate via a single bit stream comprising both data and digitized voice, a more conventional operator position, such as that used in the Traffic Service Position System manufactured by AT&T Technologies, Inc. in which the voice and data communications are separate, can also be used. For the latter type of arrangement, the processor communicates with the operator position directly or via a controller and does not use a packet switching network for this purpose. Note further that while the present embodiment of the invention uses a digital circuit network, an analog network, such as that used in the Traffic Service Position System, could also be used, either by connecting the operator position voice path directly to the analog network and using a separate control data path to the processor, or by providing an appropriate digital-to-analog interface between an ISDN operator position and the analog network.

For the sake of simplicity, processor 101 has been shown as a single entity. In many modern systems a distributed processor system is used so that the central processing unit 102 is, in fact, many units, and the memory 103, many modules of memory. Similarly, network 104 may be modular and may also include remote modules. If a distributed processor system is used, different processors within the distributed processor complex may be accessed using different D-channels from the packet switching network. The apportionment of control functions and memory within the distributed processor system would be done by methods well known in the art.

While the arrangement which has been shown indicates a separate data communication path 140 for interconnecting two systems, the same kinds of facilities which are used for operator interconnecting trunks can sometimes also be used for the transmission of data between the systems.

The above description is considered to be only an illustrative embodiment of the invention, plus a number of suggested alternatives in parts of the embodiment. It is to be understood that various and numerous other arrangements may be devised by one skilled in the art without departing from the spirit and scope of the invention. The invention is thus limited only as defined in the accompanying claims.

What is claimed is:

1. In a communication network, means for serving an operator assistance request, comprising:
   a first operator assistance system adapted to be connected to a plurality of lines or trunks and comprising an operator position;
   a second operator assistance system comprising an operator position;
   communication means interconnecting said first and said second operator assistance systems;
   said first system comprising means for detecting an operator assistance request on one of said plurality of lines or trunks, and for generating a first indication if said operator assistance request is to be served by said operator position of said first system and for generating a second indication if said operator assistance request is to be served by said operator position of said second system;
   means responsive to detection of a request and to said first indication for establishing a connection between said one of said plurality of lines or trunks and said operator position of said first system;
   means responsive to said second indication and to detection of a request for establishing a connection between said one of said plurality of lines of trunks and said communication means and for generating and transmitting a first data message over said communication means to said second system;
   said second system comprising means for establishing a connection between said communication means and said operator position of said second system in response to said first data message;
   said operator position of said second system responsive to data keyed by an operator to generate response data signals relating to said operator assistance request;
   said second system further comprising means for transmitting second data messages, representing said response data signals, to said first system over said communication means; and
   said first operator assistance system further comprising means, responsive to said second data messages, for establishing a connection between said one of said plurality of lines or trunks and a selected other one of said plurality of lines or trunks.

2. The means for serving an operator assistance request of claim 1 in which said means for detecting an operator assistance request and for generating a first and second indication comprises storage for a flag, and in which said first indication is generated if said flag is reset and said second indication is generated if said flag is set.

3. The means for serving an operator assistance request of claim 2 in which said second operator assistance system further comprises means for transmitting third data messages to said first operator assistance system, and in which said means for detecting an operator assistance request and for generating a first and a second indication is responsive to said third data messages to set and reset said flag.

4. The means for serving an operator assistance request of claim 3 in which said means for transmitting third data messages comprises means for calculating traffic data representing the amount of operator request traffic which can be accepted in said second system, and in which said third data messages comprises said traffic control data, and in which said means for detecting an operator assistance request and for generating said first and second indications is further responsive to said traffic control data received in said third data message to adjust the generation of said first and second indications.

5. The means for serving an operator assistance request of claim 4 in which said means for detecting an operator assistance request and for generating first and second indications is further adapted to detect the level of unserved operator assistance requests and to generate and transmit transfer request data messages over said communication means to said second operator assistance system in response to detection of a level of unserved operator assistance requests above a threshold; and in which said means for transmitting third data messages is responsive to reception of said transfer request data messages.

6. The means for serving an operator assistance request of claim 5 in which said means for detecting an operator assistance request and for generating first and second indications adapted to detect the level of unserved operator assistance requests is further adapted to calculate the estimated delay to serve an operator assistance request and to test whether said estimated delay exceeds a threshold.

7. The means for serving an operator assistance request of claim 3 in which said means for transmitting third messages is adapted to calculate the estimated delay to serve operator assistance requests in said second system and to generate a third message to set said flag if said estimated delay is below a threshold 8. The means for serving an operator assistance request of claim 2 further comprising a control terminal for generating and transmitting data messages, and data communication means for connecting said control terminal to said first system, wherein said control terminal transmits a call transfer control message comprising a set/reset indication over said data communication means to said first operator assistance system in response to data keyed into said control terminal, and wherein said first system is responsive to reception of said call transfer control message and said set/reset indication to control said flag.

9. The means for serving an operator assistance request of claim 1 in which said means for detecting an operator assistance request and for generating a first and second indication is adapted to calculate the estimated delay in serving operator assistance requests in said first system and to generate said second indication when the estimated delay exceeds a predetermined threshold and to generate said first indication when the estimated delay does not exceed said predetermined threshold.

10. The means for serving an operator assistance request of claim 1 wherein said second operator assistance system further comprises processor means and data packet switching means, connected to said processor means and said operator position of said second system, for transmission of data packets between said processor means and said operator assistance position of said second system.

11. The means for serving an operator assistance request of claim 10 further comprising means for transmitting data packets between said first operator assistance system and said operator position of said second system via said data packet switching means.

12. In a communications network, means for serving an operator assistance request, comprising
a plurality of operator assistance systems, at least two of said operator assistance systems comprising an operator position and each of said plurality of operator assistance systems adapted to be connected to a plurality of lines or trunks;
data communication means connecting a first of said operator assistance systems with each of the others of said plurality of operator assistance systems;
voice communication means interconnecting each of said plurality of operator assistance systems with at least one other of said plurality of operator assistance systems;
each of said operator assistance systems adapted to connect any of said plurality of lines or trunks for that system to said voice communication means for connection to an operator position on another of said operator assistance systems and each of said at least two systems adapted to connect said voice communication means to an operator position of said system;
wherein said first one of said operator assistance systems is adapted to send data messages to a second of said plurality of operator assistance systems directing said second system to set up a connection from one of the lines or trunks for said second system to said communication means for connection to an operator position on a third of said operator assistance systems.

13. The means for serving an operator assistance request of claim 12 in which said data communication means comprises a packet switching network.

14. The means for serving an operator assistance request of claim 13 in which said data communication means comprises a common channel interoffice signaling system.

15. In a communication network, means for serving an operator assistance request, comprising:
a first operator assistance system adapted to be connected to a plurality of lines or trunks and comprising an operator position;
a second operator assistance system comprising an operator position;
communication means interconnecting said first and said second operator assistance systems;
said first system comprising means for detecting an operator assistance request on one of said plurality of lines or trunks and for generating a first indication if said operator assistance request is to be served by said operator position of said first system and for generating a second indication if said operator assistance request is to be served by said operator position of said second system;
means responsive to detection of a request and to said first indication for establishing a connection between said one of said plurality of lines or trunks and said operator position of said first system;
means responsive to said second indication and to detection of a request for establishing a connection between said one of said plurality of lines of trunks and said communication means and for generating and transmitting a first data message over said communication means to said second system;
said second system comprising means for establishing a connection between said communication means and said operator position of said second system in response to said first data message;
said operator position of said second system responsive to data keyed by an operator to generate response data signals relating to said operator assistance request;
said second system further comprising means for transmitting second data messages, representing said response data signals, to said first system over said communication means; and
said first operator assistance system further comprising means responsive to said second data messages to record data received in said second data messages.

16. In a communications network, means for serving an operator assistance request, comprising:
a first operator assistance system adapted to be connected to a plurality of lines or trunks;
a second operator assistance system comprising an operator position;
communication means interconnecting said first and said second operator assistance systems;
said first system comprising means for detecting an operator assistance request on one of said plurality of lines or trunks, means responsive to detection of a request for establishing a connection between said one of said plurality of lines of trunks and said communication means and for generating and transmitting a first data message over said communication means to said second system;
said second system comprising means for establishing a connection between said communication means and said operator position in response to said first data message;
said operator position responsive to data keyed by an operator to generate response data signals relating to said operator assistance request;
said second operator assistance system further comprising means for transmitting second data messages, representing said response data signals, to said first operator assistance system over said communication means; and
said first operator assistance system further comprising means, responsive to said second data messages, for establishing a connection between said one of said plurality of lines or trunks and a selected other one of said plurality of lines or trunks.

17. The means for serving an operator assistance request of claim 16 wherein said second operator assistance system further comprises processor means and data packet switching means, connected to said processor means and said operator position of said second system, for transmission of data packets between said processor means and said operator assistance position of said second system.

18. The means for serving an operator assistance request of claim 17 further comprising means for transmitting data packets between said first operator assistance system and said operator position of said second system via said data packet switching means.

19. In a communications network, means for serving an operator assistance request, comprising:
a first operator assistance system adapted to be connected to a plurality of lines or trunks;
a second operator assistance system comprising an operator assistance position;
communication means interconnecting said first and said second operator assistance systems;
said first system comprising means for detecting an operator assistance request on one of said plurality of lines or trunks, means responsive to detection of a request for establishing a connection between said one of said plurality of lines of trunks and said communication means and for generating and transmitting a first data message over said communication means to said second system;
said second system comprising means for establishing a connection between said communication means and said operator position in response to said first data message;
said operator position responsive to data keyed by an operator to generate response data signals relating to said operator assistance request;
said second operator assistance system further comprising means for transmitting second data messages, representing said response data signals, to said first operator assistance system over said communication means; and
said first operator assistance system further comprising means responsive to said second data messages to record data received in said second data messages.

20. In a communication network, means for serving operator assistance requests of a first type and of a second type, comprising:
a first operator assistance system adapted to be connected to a plurality of lines or trunks and comprising an operator position;
a second operator assistance system comprising an operator position;
communication means interconnecting said first and said second operator assistance systems;
said first system comprising means for detecting an operator assistance request on one of said plurality of lines or trunks and for identifying the type of said operator assistance request and
for generating a first indication if an operator assistance request of said first type is to be served by said operator position of said first system, for generating a second indication if an operator assistance request of said first type is to be served by said operator position of said second system, for generating a third indication if an operator assistance request of said second type is to be served by said operator position of said first system, and for generating a fourth indication if an operator assistance request of said second type is to be served by said operator position of said second system;
means responsive to detection of a request of said first type and to said first indication, and responsive to detection of a request of said second type and to said third indication, for establishing a connection between said one of said plurality of lines or trunks and said operator position of said first system;
means responsive to said second indication and to detection of a request of said first type, and to said fourth indication and to detection of a request of said second type, for establishing a connection between said one of said plurality of lines of trunks and said communication means and for generating and transmitting a first data message over said communication means to said second system;
said second system, comprising means for establishing a connection between said communication means and said operator position of said second system in response to said first data message;
said operator position of said second system responsive to data keyed by an operator to generate response data signals relating to said operator assistance request;
said second system further comprising means for generating and transmitting second data messages, representing said response data signals, to said first system over said communication means; and
said first operator assistance system further comprising means, responsive to said second data messages for establishing a connection between said one of said plurality of lines or trunks and a selected other one of said plurality of lines or trunks.

21. The means for serving operator assistance request of claim 20 in which said means for detecting an operator assistance request and identifying the type and for generating first, second, third and fourth indications comprises storage for a first and a second flag, and in which said first indication is generated if said first flag is reset, said second indication is generated if said first flag is set, said third indication is generated if said second flag is reset, and said fourth indication is set if said second flag is set.

22. The means for serving operator assistance requests of claim 21 in which said means for generating and transmitting second data messages of said second operator assistance system is further adapted to generate and transmit third data messages to said first operator assistance system, and in which said means for detecting an operator assistance request and identifying the type, and for generating a first, second, third and fourth indication is responsive to said third data messages to set and reset said first and second flags.

23. The means for serving operator assistance requests of claim 22 in which said means for detecting an operation assistance request and identifying the type and for generating first, second, third and fourth indications is further adapted to detect the level of unserved operator assistance requests for each of said two types of operator assistance requests and to generate and transmit transfer request data messages over said communication means to said second operator assistance system in response to detection of a level of unserved operator assistance requests above a threshold for each of said two types; and in which said means for generating and transmitting second and third data messages of said second system is responsive to reception of said transfer request data messages in said second system.

24. In a communication network comprising a plurality of operator assistance systems, each of said operator assistance systems serving a plurality of lines or trunks and at least two of said plurality of operator assistance systems comprising an operator position, data communication means connecting a first of said operator assistance systems with each of the others of said plurality of operator assistance systems, and voice communication means interconnecting each of said plurality of operator assistance systems with at least one other of said plurality of operator assistance systems, a method of serving an operator service request on a specific line or trunk served by a second of said operator assistance systems comprising the steps of:

sending first data messages over said data communication means from each of the others of said plurality of operator assistance systems to said first system, said first data messages comprising operator assistance request traffic data for each of the others of said systems;

analyzing the operator assistance request traffic data from said first messages to allocate operator assistance requests from each of said operator assistance systems to each of said at least two of said plurality of systems comprising operator positions;

sending second data messages comprising data representing said allocation from said first operator assistance system over said data communication means to each of the others of said plurality of operator assistance systems;

responsive to one of said second data messages, allocating said operator assistance request of said specific line served by said second system to a third of said operator assistance systems;

establishing a connection between said specific line and said communication means for connection to said third of said operator assistance systems.

25. An operator assistance system for serving an operator assistance request, and adapted to be connected to a plurality of lines or trunks and to communication means for interconnecting said system with other operator assistance systems, comprising:

an operator position;

means for detecting an operator assistance request on one of said plurality of lines or trunks and for generating a first indication if said operator assistance request is to be served by said operator position of said first system and for generating a second indication if said operator assistance request is to be served by an operator position of one of said other operator assistance systems;

means responsive to detection of a request and to said first indication for establishing a connection between said one of said plurality of lines or trunks and said operator position of said first system;

means responsive to said second indication and to detection of a request for establishing a connection between said one of said plurality of lines or trunks and said communication means and for generating a first data message for transmission over said communication means;

said first operator assistance system further comprising means, responsive to second data messages received from said communication means, for establishing a connection between said one of said plurality of lines or trunks and a selected other one of said plurality of lines or trunks.

26. The operator assistance system of claim 25 in which said means for detecting an operator assistance request and for generating a first and second indication comprises storage for a flag, and in which said first indication is generated if said flag is reset and said second indication is generated if said flag is set.

27. The operator assistance system of claim 26 in which said flag is set and reset in response to third data messages received from said communication means.

* * * * *